(12) United States Patent
Ogata et al.

(10) Patent No.: US 10,817,096 B2
(45) Date of Patent: Oct. 27, 2020

(54) FORCE SENSOR INCORPORATED INTO DISPLAY

(71) Applicant: Apple Inc., Cupertino, CA (US)

(72) Inventors: Charley T. Ogata, Cupertino, CA (US); Martin P. Grunthaner, Cupertino, CA (US); Michael B. Wittenberg, Cupertino, CA (US); Peter W. Richards, San Francisco, CA (US); Romain A. Teil, Cupertino, CA (US); Steven P. Hotelling, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/616,059

(22) Filed: Feb. 6, 2015

(65) Prior Publication Data

US 2016/0098131 A1  Apr. 7, 2016

Related U.S. Application Data

(60) Provisional application No. 61/936,858, filed on Feb. 6, 2014.

(51) Int. Cl.
*G06F 3/041* (2006.01)
*G06F 1/16* (2006.01)
(Continued)

(52) U.S. Cl.
CPC .......... *G06F 3/0414* (2013.01); *G06F 1/1643* (2013.01); *G06F 3/03547* (2013.01);
(Continued)

(58) Field of Classification Search
CPC .... G06F 3/0416; G06F 3/0414; G06F 3/0418; G06F 19/3418; G06F 3/016
(Continued)

(56) References Cited

U.S. PATENT DOCUMENTS

| 4,527,862 A | 7/1985 | Arakawa |
| 5,343,064 A | 8/1994 | Spangler et al. |

(Continued)

FOREIGN PATENT DOCUMENTS

| CN | 1378169 | 11/2002 |
| CN | 1502166 | 6/2004 |

(Continued)

OTHER PUBLICATIONS

Bau, et al., "TeslaTouch: Electrovibration for Touch Surfaces," UIST'10, Oct. 3-6, 2010, New York, New York USA, 10 pages.
(Continued)

*Primary Examiner* — William Boddie
*Assistant Examiner* — Alecia D English
(74) *Attorney, Agent, or Firm* — Brownstein Hyatt Farber Schreck, LLP

(57) ABSTRACT

A force-sensitive device for electronic device. The force inputs may be detected by measuring changes in capacitance, as measured by surface flex of a device having a flexible touchable surface, causing flex at a compressible gap within the device. A capacitive sensor responsive to changes in distance across the compressible gap. The sensor can be positioned above or below, or within, a display element, and above or below, or within, a backlight unit. The device can respond to bending, twisting, or other deformation, to adjust those zero force measurements. The device can use measure of surface flux that appear at positions on the surface not directly the subject of applied force, such as when the user presses on a part of the frame or a surface without capacitive sensors.

25 Claims, 20 Drawing Sheets

(51) Int. Cl.
*G06F 3/0354* (2013.01)
*G06F 3/044* (2006.01)

(52) U.S. Cl.
CPC ............ *G06F 3/044* (2013.01); *G06F 3/0412* (2013.01); *G06F 3/0416* (2013.01); *G06F 2203/04105* (2013.01)

(58) Field of Classification Search
IPC ............... G06F 3/0418,3/0414, 19/3418, 3/016
See application file for complete search history.

(56) References Cited

U.S. PATENT DOCUMENTS

| | | | |
|---|---|---|---|
| 5,929,517 A | 7/1999 | Distefano et al. |
| 6,002,389 A | 12/1999 | Kasser |
| 6,079,282 A | 6/2000 | Lanter |
| 6,154,580 A | 11/2000 | Kuriyama et al. |
| 6,310,614 B1 | 10/2001 | Maeda |
| 6,323,846 B1 | 11/2001 | Westerman et al. |
| 6,545,495 B2 | 4/2003 | Warmack et al. |
| 6,568,275 B2 | 5/2003 | Scholz et al. |
| 6,570,557 B1 | 5/2003 | Westerman et al. |
| 6,570,707 B1 | 5/2003 | Murakami |
| 6,676,611 B1 | 1/2004 | Bromba |
| 6,677,932 B1 | 1/2004 | Westerman |
| 6,989,728 B2 | 1/2006 | Van Zeeland et al. |
| 7,158,122 B2 | 1/2007 | Roberts |
| 7,211,885 B2 | 5/2007 | Nordal et al. |
| 7,337,085 B2 | 2/2008 | Soss |
| 7,409,876 B2 | 8/2008 | Ganapathi et al. |
| 7,511,702 B2 | 3/2009 | Hotelling |
| 7,538,760 B2 | 5/2009 | Hotelling et al. |
| 7,609,178 B2 | 10/2009 | Son et al. |
| 7,719,522 B2 | 5/2010 | Lyon et al. |
| 7,784,366 B2 | 8/2010 | Daverman et al. |
| 7,800,592 B2 | 9/2010 | Kerr et al. |
| 7,920,134 B2 | 4/2011 | Krah |
| 7,946,758 B2 | 5/2011 | Mooring |
| 8,072,437 B2 | 12/2011 | Miller et al. |
| 8,111,248 B2 | 2/2012 | Lee et al. |
| 8,169,332 B2 | 5/2012 | Bernstein et al. |
| 8,169,416 B2 | 5/2012 | Han |
| 8,228,306 B2 | 7/2012 | Long |
| 8,253,711 B2 | 8/2012 | Kim et al. |
| 8,274,495 B2 | 9/2012 | Lee |
| 8,310,458 B2 | 11/2012 | Faubert et al. |
| 8,334,849 B2 | 12/2012 | Murphy et al. |
| 8,351,993 B2 | 1/2013 | Nunes |
| 8,390,481 B2 | 3/2013 | Pance et al. |
| 8,421,978 B2 | 4/2013 | Wang et al. |
| 8,436,823 B2 | 5/2013 | Kanehira et al. |
| 8,502,800 B1* | 8/2013 | Vier ...................... G06F 3/0416 345/174 |
| 8,525,797 B2 | 9/2013 | Liu et al. |
| 8,547,339 B2 | 10/2013 | Ciesla |
| 8,547,350 B2 | 10/2013 | Anglin et al. |
| 8,577,289 B2 | 11/2013 | Schlub et al. |
| 8,577,644 B1 | 11/2013 | Ksondzyk et al. |
| 8,633,916 B2 | 1/2014 | Bernstein et al. |
| 8,638,316 B2 | 1/2014 | Badaye et al. |
| 8,669,963 B2 | 3/2014 | Baker et al. |
| 8,704,787 B2 | 4/2014 | Yamamoto et al. |
| 8,711,122 B2 | 4/2014 | Wada et al. |
| 8,724,861 B1 | 5/2014 | Sun |
| 8,730,189 B2 | 5/2014 | Mamba et al. |
| 8,743,083 B2 | 6/2014 | Zanone et al. |
| 8,760,413 B2 | 6/2014 | Peterson et al. |
| 8,780,055 B2 | 7/2014 | Marchand et al. |
| 8,780,062 B2 | 7/2014 | Hibara et al. |
| 8,780,075 B2 | 7/2014 | Yamano et al. |
| 8,805,517 B2 | 8/2014 | Radivojevic et al. |
| 8,810,521 B2 | 8/2014 | Ito |
| 8,830,205 B2 | 9/2014 | Chang et al. |
| 8,878,803 B2 | 11/2014 | Kimura et al. |
| 8,913,031 B2 | 12/2014 | Honda et al. |
| 8,922,523 B2 | 12/2014 | Lynch et al. |
| 8,963,874 B2 | 2/2015 | Li et al. |
| 8,988,364 B2 | 3/2015 | Lee |
| 9,001,080 B2 | 4/2015 | Okayama et al. |
| 9,024,898 B2 | 5/2015 | Kim et al. |
| 9,024,907 B2 | 5/2015 | Bolender |
| 9,030,440 B2 | 5/2015 | Pope et al. |
| 9,057,653 B2 | 6/2015 | Schediwy et al. |
| 9,086,768 B2 | 7/2015 | Elias et al. |
| 9,088,282 B2 | 7/2015 | Holenarsipur et al. |
| 9,092,129 B2 | 7/2015 | Abdo et al. |
| 9,104,898 B2 | 8/2015 | Case |
| 9,116,569 B2 | 8/2015 | Stacy et al. |
| 9,146,642 B2 | 9/2015 | Yamano |
| 9,207,134 B2 | 12/2015 | Ting et al. |
| 9,218,472 B2 | 12/2015 | Alameh et al. |
| 9,229,587 B2 | 1/2016 | Kawaguchi et al. |
| 9,235,645 B1 | 1/2016 | Ishizone et al. |
| 9,262,002 B2 | 2/2016 | Momeyer et al. |
| 9,323,372 B2 | 4/2016 | Kim et al. |
| 9,354,752 B2 | 5/2016 | Kanehira et al. |
| 9,375,874 B2 | 6/2016 | Lin et al. |
| 9,390,308 B2 | 7/2016 | Mankowski et al. |
| 9,411,458 B2 | 8/2016 | Worfolk et al. |
| 9,430,102 B2 | 8/2016 | Prest et al. |
| 9,454,268 B2 | 9/2016 | Badaye et al. |
| 9,459,738 B2 | 10/2016 | Lin et al. |
| 9,477,342 B2 | 10/2016 | Daverman et al. |
| 9,541,578 B2 | 1/2017 | Shimata et al. |
| 9,542,589 B2 | 1/2017 | Thammasouk et al. |
| 9,551,621 B2 | 1/2017 | Shimoyama et al. |
| 9,619,044 B2 | 4/2017 | Tenuta |
| 9,671,889 B1 | 6/2017 | Miller et al. |
| 9,678,586 B2 | 6/2017 | Reynolds |
| 9,710,095 B2 | 7/2017 | Hotelling |
| 9,715,301 B2 | 7/2017 | Kuboyama et al. |
| 9,772,245 B2 | 9/2017 | Besling et al. |
| 9,785,301 B2 | 10/2017 | Watazu |
| 9,851,828 B2 | 12/2017 | Richards et al. |
| 9,910,529 B2 | 3/2018 | Chang et al. |
| 10,000,937 B2 | 6/2018 | Bushnell et al. |
| 10,037,134 B2 | 7/2018 | Lee et al. |
| 10,048,789 B2 | 8/2018 | Filiz et al. |
| 10,162,444 B2 | 12/2018 | Ogata et al. |
| 10,168,814 B2 | 1/2019 | Hotelling et al. |
| 10,198,123 B2 | 2/2019 | Chen et al. |
| 10,268,884 B2 | 4/2019 | Jones et al. |
| 10,295,562 B1 | 5/2019 | Bushnell et al. |
| 10,325,142 B2 | 6/2019 | He et al. |
| 10,365,763 B2 | 7/2019 | Donnelly et al. |
| 10,367,252 B2 | 7/2019 | Ehman et al. |
| 10,386,970 B2 | 8/2019 | Filiz et al. |
| 2002/0133310 A1* | 9/2002 | Tamura ................... G01L 1/205 702/139 |
| 2004/0113895 A1* | 6/2004 | Lubarsky, Jr. ........ G06F 3/0418 345/174 |
| 2005/0005703 A1 | 1/2005 | Saito et al. |
| 2005/0077988 A1* | 4/2005 | Van Zeeland ...... H01H 13/7013 335/205 |
| 2006/0197753 A1 | 9/2006 | Hotelling |
| 2007/0272919 A1* | 11/2007 | Mori ................... H01L 51/0012 257/40 |
| 2008/0150901 A1 | 6/2008 | Lowles et al. |
| 2009/0015564 A1 | 1/2009 | Ye et al. |
| 2009/0066345 A1 | 3/2009 | Klauk et al. |
| 2009/0237374 A1 | 9/2009 | Li et al. |
| 2009/0243817 A1* | 10/2009 | Son ....................... G06F 3/0414 340/407.2 |
| 2010/0045628 A1 | 2/2010 | Gettemy et al. |
| 2010/0117989 A1 | 5/2010 | Chang |
| 2010/0123686 A1 | 5/2010 | Klinghult et al. |
| 2010/0220065 A1 | 9/2010 | Ma |
| 2011/0012845 A1 | 1/2011 | Rothkopf et al. |
| 2011/0012869 A1* | 1/2011 | Klinghult .............. G06F 1/3203 345/178 |
| 2011/0037706 A1 | 2/2011 | Pasquero et al. |
| 2011/0080349 A1* | 4/2011 | Holbein ................ G06F 1/3203 345/173 |
| 2011/0080373 A1 | 4/2011 | Wang et al. |

(56) References Cited

U.S. PATENT DOCUMENTS

| | | |
|---|---|---|
| 2011/0096013 A1 | 4/2011 | Krumpelman et al. |
| 2011/0115742 A1* | 5/2011 | Sobel .................. G06F 21/32 |
| | | 345/174 |
| 2011/0163991 A1* | 7/2011 | Tout .................... G06F 3/016 |
| | | 345/174 |
| 2011/0216016 A1 | 9/2011 | Rosener |
| 2011/0227866 A1 | 9/2011 | Kawaguchi et al. |
| 2011/0227872 A1* | 9/2011 | Huska ................ G06F 3/0414 |
| | | 345/174 |
| 2011/0235156 A1 | 9/2011 | Kothari et al. |
| 2011/0272088 A1 | 11/2011 | Cincotti |
| 2012/0038577 A1 | 2/2012 | Brown et al. |
| 2012/0056826 A1 | 3/2012 | Kim et al. |
| 2012/0086669 A1* | 4/2012 | Kim .................... G06F 3/044 |
| | | 345/174 |
| 2012/0089348 A1 | 4/2012 | Perlin et al. |
| 2012/0090757 A1 | 4/2012 | Buchan et al. |
| 2012/0092285 A1 | 4/2012 | Osborn et al. |
| 2012/0098760 A1 | 4/2012 | Chuang |
| 2012/0098767 A1 | 4/2012 | Takai et al. |
| 2012/0104097 A1 | 5/2012 | Moran et al. |
| 2012/0105358 A1 | 5/2012 | Momeyer et al. |
| 2012/0126941 A1 | 5/2012 | Coggill et al. |
| 2012/0169612 A1 | 7/2012 | Alameh et al. |
| 2012/0188202 A1 | 7/2012 | Tsujino et al. |
| 2012/0274602 A1 | 11/2012 | Bita et al. |
| 2012/0313863 A1* | 12/2012 | Hsu .................. G06F 3/0412 |
| | | 345/173 |
| 2012/0319987 A1* | 12/2012 | Woo .................. G06F 3/016 |
| | | 345/174 |
| 2013/0076375 A1 | 3/2013 | Hanumanthaiah et al. |
| 2013/0098548 A1 | 4/2013 | Chen |
| 2013/0113732 A1 | 5/2013 | Kang et al. |
| 2013/0128416 A1 | 5/2013 | Weber |
| 2013/0162591 A1 | 6/2013 | Hidaka et al. |
| 2013/0176270 A1 | 7/2013 | Cattivelli et al. |
| 2013/0328575 A1 | 12/2013 | Ra et al. |
| 2014/0085213 A1 | 3/2014 | Huppi et al. |
| 2014/0085247 A1* | 3/2014 | Leung ................ G06F 3/0414 |
| | | 345/174 |
| 2014/0111953 A1 | 4/2014 | McClure et al. |
| 2014/0132572 A1* | 5/2014 | Rusanen ............. G06F 3/0418 |
| | | 345/178 |
| 2015/0070600 A1 | 3/2015 | Kawaguchi et al. |
| 2015/0071509 A1 | 3/2015 | Myers |
| 2015/0135108 A1 | 5/2015 | Pope et al. |
| 2015/0153829 A1 | 6/2015 | Shiraishi |
| 2015/0175861 A1 | 6/2015 | Nagata et al. |
| 2015/0177077 A1* | 6/2015 | Hanson ................ G01L 1/146 |
| | | 73/862.626 |
| 2015/0185909 A1 | 7/2015 | Gecnuk |
| 2015/0185946 A1 | 7/2015 | Fourie |
| 2016/0033342 A1 | 2/2016 | Lyon et al. |
| 2016/0041648 A1 | 2/2016 | Richards |
| 2016/0042166 A1 | 2/2016 | Kang et al. |
| 2016/0062498 A1 | 3/2016 | Huppi et al. |
| 2016/0070404 A1 | 3/2016 | Kerr et al. |
| 2016/0103544 A1 | 4/2016 | Filiz et al. |
| 2016/0224168 A1 | 8/2016 | Watanabe et al. |
| 2016/0313205 A1* | 10/2016 | Gowreesunker ........ G01L 25/00 |
| 2016/0314334 A1 | 10/2016 | He et al. |
| 2016/0378255 A1* | 12/2016 | Butler .................. G01L 1/146 |
| | | 345/174 |
| 2017/0046008 A1 | 2/2017 | Chen et al. |
| 2017/0235403 A1 | 8/2017 | Miller et al. |
| 2017/0285746 A1 | 10/2017 | Kim et al. |
| 2017/0322660 A1 | 11/2017 | Kuboyama et al. |
| 2018/0039332 A1 | 2/2018 | Liang et al. |
| 2018/0048058 A1 | 2/2018 | Ehman et al. |
| 2018/0069588 A1 | 3/2018 | Jiang et al. |
| 2018/0088702 A1 | 3/2018 | Shutzberg et al. |
| 2018/0138102 A1 | 5/2018 | Pan et al. |
| 2018/0275811 A1 | 9/2018 | Filiz et al. |
| 2019/0025923 A1 | 1/2019 | Kim et al. |
| 2019/0213377 A1 | 7/2019 | Miller et al. |
| 2019/0311172 A1 | 10/2019 | Kang et al. |
| 2019/0369779 A1 | 12/2019 | Harley et al. |

FOREIGN PATENT DOCUMENTS

| | | |
|---|---|---|
| CN | 1577385 | 2/2005 |
| CN | 1582453 | 2/2005 |
| CN | 1707415 | 12/2005 |
| CN | 1714336 | 12/2005 |
| CN | 101046720 | 10/2007 |
| CN | 101207971 | 6/2008 |
| CN | 101427468 | 5/2009 |
| CN | 101630210 | 1/2010 |
| CN | 101673001 | 3/2010 |
| CN | 101950224 | 1/2011 |
| CN | 102016780 | 4/2011 |
| CN | 201828892 | 5/2011 |
| CN | 102087432 | 6/2011 |
| CN | 102103445 | 6/2011 |
| CN | 102138120 | 7/2011 |
| CN | 102193699 | 9/2011 |
| CN | 102299166 | 12/2011 |
| CN | 102365608 | 2/2012 |
| CN | 102449583 | 5/2012 |
| CN | 102467308 | 5/2012 |
| CN | 102478985 | 5/2012 |
| CN | 102483673 | 5/2012 |
| CN | 103221906 | 7/2013 |
| CN | 104700102 | 6/2015 |
| CN | 204650590 | 9/2015 |
| EP | 2073107 | 6/2009 |
| EP | 2128747 | 12/2009 |
| EP | 2237142 | 10/2010 |
| EP | 2267791 | 12/2010 |
| EP | 2315102 | 4/2011 |
| EP | 2315186 | 4/2011 |
| EP | 2357547 | 8/2011 |
| EP | 2413224 | 2/2012 |
| EP | 2418561 | 2/2012 |
| EP | 2420918 | 2/2012 |
| EP | 2508960 | 10/2012 |
| EP | 2660688 | 11/2013 |
| EP | 2708985 | 3/2014 |
| GB | 2313195 | 11/1997 |
| JP | S61292732 | 12/1986 |
| JP | 2000200141 | 7/2000 |
| JP | 2005031425 | 2/2005 |
| JP | 2006134144 | 5/2006 |
| JP | 2007097842 | 4/2007 |
| JP | 2007310539 | 11/2007 |
| JP | 2010225031 | 10/2010 |
| JP | 2010244252 | 10/2010 |
| JP | 2011100364 | 5/2011 |
| JP | 2011180854 | 9/2011 |
| JP | 2012511360 | 5/2012 |
| JP | 2013131068 | 7/2013 |
| JP | 2014052997 | 3/2014 |
| KR | 1020100074005 | 7/2010 |
| WO | WO 97/018528 | 5/1997 |
| WO | WO 11/081882 | 7/2011 |
| WO | WO 11/156447 | 12/2011 |
| WO | WO 12/031564 | 3/2012 |
| WO | WO 12/147659 | 11/2012 |
| WO | WO 12/160844 | 11/2012 |
| WO | WO 13/083207 | 6/2013 |
| WO | WO 13/183191 | 12/2013 |
| WO | WO 14/018121 | 1/2014 |
| WO | WO 12/153555 | 7/2014 |
| WO | WO 14/124173 | 8/2014 |

OTHER PUBLICATIONS

Engineers Edge, Common Plastic Molding Design Material Specification, 2015, http://www.engineersedge.com/plastic/materials_common_plastic.htm, 3 pages.

(56) References Cited

OTHER PUBLICATIONS

Feist, "Samsung snags patent for new pressure sensitive touch-screens," posted on AndroidAuthority.com at URL: http://www.androidauthority.com/samsung-patent-pressure-sensitive-touchscreens-354860, Mar. 7, 2014, 1 page.

Widdle, "Measurement of the Poisson's ratio of flexible polyurethane foam and its influence on a uniaxial compression model," International Journal of Engineering Science, vol. 46, 2008, pp. 31-49.

* cited by examiner

FORCE SENSOR INCORPORATED INTO DISPLAY

CROSS-REFERENCE TO RELATED APPLICATION

This application claims the benefit under 35 U.S.C. § 119(e) of U.S. Provisional Patent Application No. 61/936,858, filed on Feb. 6, 2014, and entitled "Force Sensor Incorporated into Display," which is incorporated by reference as if fully disclosed herein.

TECHNICAL FIELD

This application generally relates to sensing a force exerted against a surface, and more particularly to sensing a force through capacitance changes.

BACKGROUND

Touch-sensitive devices generally provide for identification of positions where the user touches the device, including movement, gestures, and other effects of position detection. For a first example, touch-sensitive devices can provide information to a computing system regarding user interaction with a graphical user interface (GUI), such as pointing to elements, reorienting or repositioning those elements, editing or typing, and other GUI features. For a second example, touch-sensitive devices can provide information to a computing system suitable for a user to interact with an application program, such as relating to input or manipulation of animation, photographs, pictures, slide presentations, sound, text, other audiovisual elements, and otherwise.

Some touch-sensitive devices are able to determine a location of touch, or multiple locations for more than one touch, using sensing devices that are additional to those sensing devices already part of the touch-sensitive device.

Generally, however, touch is binary. The touch is present and sensed, or it is not. This is true of many user inputs and input/output devices. A key of a keyboard, for example, is either pressed sufficiently to collapse a dome switch and generate an output signal, or it is not. A mouse button is either pressed sufficiently to close a switch, or it is not.

SUMMARY

This application provides techniques, including devices and method steps, which can determine amounts of force applied, and changes in amounts of force applied, by a user. For example, the user may contact a device (such as a touch-sensitive device including a touch-sensitive surface, one example of which is a touch display), or other pressure-sensitive elements (such as a virtual analog control or keyboard), or other input devices. These techniques can be incorporated into various devices also using touch recognition, touch elements of a GUI, touch input or manipulation in an application program, and otherwise (such as touch-sensitive devices, touch pads, and touch screens). This application also provides techniques, including devices and method steps that apply those techniques, which can determine amounts of force applied, and changes in amounts of force applied, by the user, as described herein, and in response thereto, provide additional functions available to a user of a device embodying those techniques.

In one embodiment, the device can include a flexible element, such as a flexible touchable surface, coupled to circuits capable of determining an amount and location of applied force. For example, the flexible touchable surface can include a touch-sensitive device or a touch display. In such embodiments, the flexible element can include a device stack, including a compressible gap and a capacitive sensor capable of detecting changes in capacitance in response to surface flex, such as caused by applied force.

For some first examples, the device stack can include either mutual capacitance or self-capacitance circuits; the device stack can include opaque, translucent, or transparent circuits disposed for detecting or measuring capacitance or changes in capacitance.

For some second examples, the capacitive sensor can be positioned at one (or possibly more) of various positions in the device stack, including above or below a display element, integrated into a display element, above or below, or integrated into, a backlight unit.

For some third examples, the compressible gap can include an air gap, a compressible substance, or a compressible structure.

In one embodiment, the device can include one or more techniques, including circuits and designs, or including method steps, which can determine a set of zero-force measurements, from which the device can determine a set of changes between zero force measured and one or more applied forces.

For example, the device can include a measure of bending, torque or twist, or other surface deformation in response to forces applied to a device frame, to adjust such zero-force measurements.

For example, the device can use one or more alternative measures of determining orientation or position, such as one or more inertial sensors, to adjust such zero-force measurements. In such cases, the device can incorporate adjustments of zero-force measurements into one or more user interface features. In examples of such cases, a measure of torque or twist, or a measure of orientation or position, may be used as an input, or to adjust an input, to one or more elements of a game or simulator.

For example, the device can use one or more measures of surface flex that can appear at surface locations other than the precise location of applied force. In such cases, the device can incorporate such measures of surface flex to detect and measure applied force at locations other than where capacitance detectors of applied force are actually positioned. In examples of such cases, detection and measurement of applied force beyond the range of capacitance detectors can be used to provide "soft" user interface buttons beyond an effective surface of applied force detection or measurement.

While multiple embodiments are disclosed, including variations thereof, still other embodiments of the present disclosure will become apparent to those skilled in the art from the following detailed description, which shows and describes illustrative embodiments of the disclosure. As will be realized, the disclosure is capable of modifications in various obvious aspects, all without departing from the spirit and scope of the present disclosure. Accordingly, the drawings and detailed description are to be regarded as illustrative in nature and not restrictive.

DETAILED DESCRIPTION

Terminology

Figure 1A:
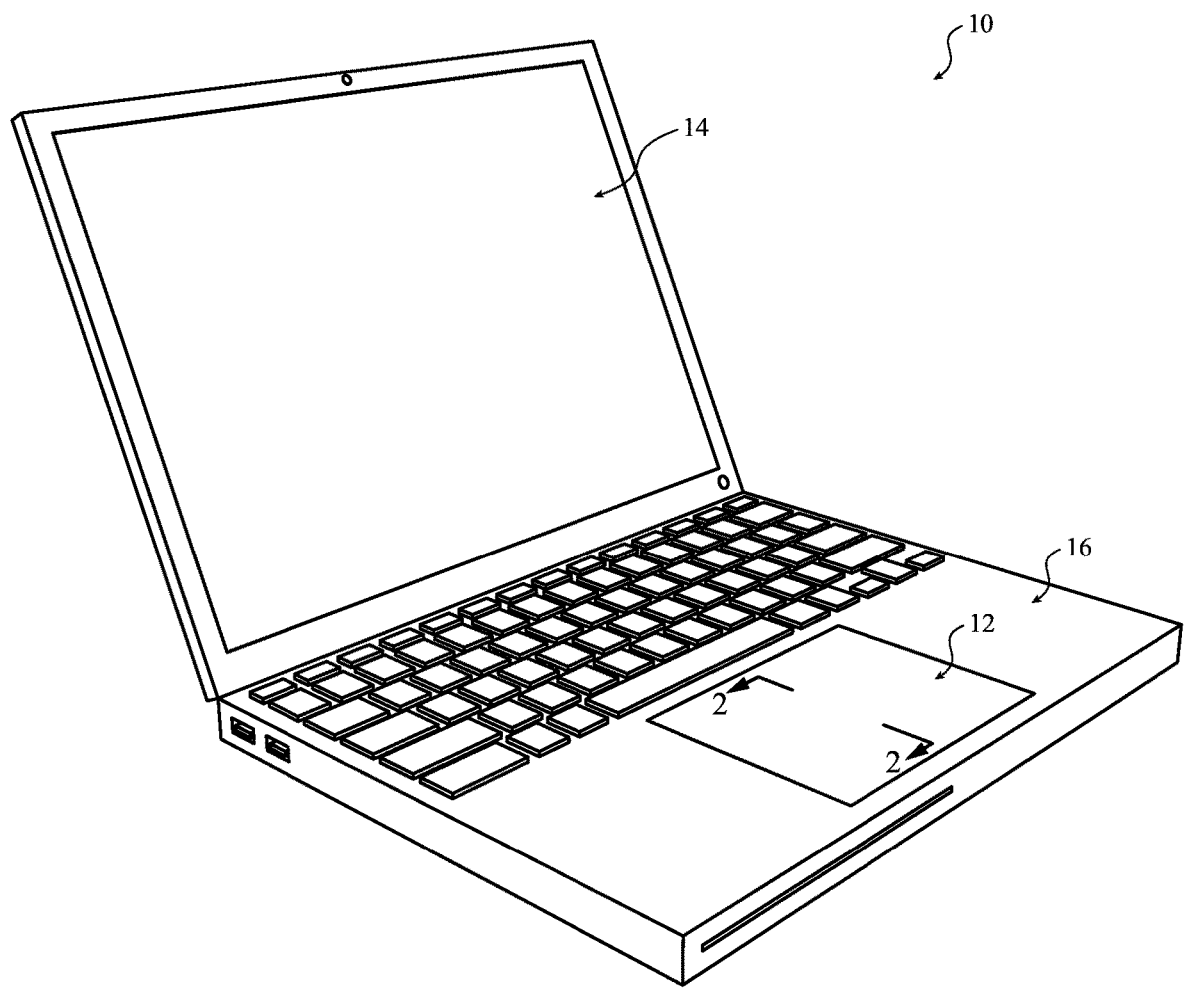
FIG. 1A is a front perspective view of a first example of a computing device incorporating a force-sensitive device.

The following terminology is exemplary, and not intended to be limiting in any way.

The text "applied force", and variants thereof, generally refers to a degree or measure of an amount of force being applied to a device. The degree or measure of applied force need not have any particular scale. For example, the measure of applied force can be linear, logarithmic, or otherwise nonlinear, and can be adjusted periodically (or otherwise, such as aperiodically, or otherwise from time to time) in response to one or more factors, either relating to applied force, location of touch, time, or otherwise.

The text "force sensing element", and variants thereof, generally refers to one or more sensors or sensing elements, that may detect an input that may be correlated to force, or a direct force input. For example, a capacitive sensor may serve as a force sensing element by measuring a change in capacitance that occurs due to a deflection or motion of some portion of a device. That change in capacitance may be employed to determine a force acting on the device. Likewise, strain sensors may function as force-sensitive devices. Generally, a force sensing element may detect an input or generate an output correlative to a force, including information sensed with respect to applied force, whether at individual locations or otherwise. For example and without limitation, a force sensing element may detect, in a relatively small region, where a user is forcibly contacting a device.

The text "surface flex", and variants thereof, generally refers to any substantial amount of flex or other deformation of a device when force is applied to that device. For example and without limitation, surface flex can include deformation, at one or more points, of a cover glass element or other surface of the device, of a device stack positioned below that cover glass element, or otherwise.

The text "touch sensing element", and variants thereof, generally refers to one or more data elements of any kind, including information sensed with respect to individual locations. For example and without limitation, a touch sensing element can include data or other information with respect to a relatively small region of where a user is contacting a touch-sensitive device.

The text "user contact", and variants thereof, and references to applied force, or contact, or touch by the user, all generally refer to any form by which a user can apply force to the device. For example and without limitation, this includes contact by a user's finger, or a stylus or other device, such as when used by a user to apply force to a touch-sensitive device, or to otherwise contact a touch-sensitive device. For example and without limitation, "user contact" can include any part of the user's finger, the user's hand, a covering on the user's finger, a soft or hard stylus, a light pen or air brush, or any other device used for pointing, touching, or applying force to, a touch-sensitive device or a surface thereof.

After reading this application, those skilled in the art would recognize that these statements of terminology would be applicable to techniques, methods, physical elements, and systems (whether currently known or otherwise), including extensions thereof inferred or inferable by those skilled in the art after reading this application.

Overview

The present disclosure is related to a force-sensitive device that may be incorporated into a variety of electronic or computing devices, such as, but not limited to, computers, smart phones, tablet computers, track pads, wearable devices, small form factor devices, and so on. The force-sensitive device may be used to detect one or more user force inputs on an input surface and then a processor (or processing unit) may correlate the sensed inputs into a force measurement and provide those inputs to the computing device. In some embodiments, the force-sensitive device may be used to determine force inputs to a track pad, a display screen, or other input surface.

The force-sensitive device may include an input surface, one or more sensing plates (such as capacitive plates), a spacing layer, and a substrate or support layer. The input surface provides an engagement surface for a user, such as the external surface of a track pad or the cover glass for a display. In other words, the input surface may receive one or more user inputs directly or indirectly.

The one or more sensing plates may include capacitive sensors or other sensing elements. The number of sensing plates may depend on the type of sensors used and in instances where the sensors sense changes in capacitance, whether the capacitive sensors are configured for mutual capacitance or self-capacitance. For example, in instances where self-capacitance may be used, a shielding member or plate may replace one of the sensing plates, such that the force-sensitive device may include one sensing plate and one shielding member or plate. In these examples, the shielding member may help to isolate the sensing plate from noise sources that may produce errors in the sensed inputs. In some embodiments, the sensing elements, such as capacitive sensors, may be defined by the intersections of rows and columns. In these embodiments, the rows and/or columns may be driven any number of ways, for example, sequentially, in a pattern (e.g., groups of rows and/or columns at a time with different waveforms), or simultaneously. In other embodiments, the capacitive sensors may be defined by an array, grid, or other layout of capacitive sense elements that are spaced apart and/or not connected to each other.

The spacing layer may be a gap between one or more components of the force-sensitive device (e.g., air), or may be a gel, foam, or other deformable material. The spacing layer may typically be configured to change in size or thickness based on a user input. That is, the spacing layer may be deformable or otherwise variable in at least one dimension.

In embodiments where the force-sensitive device may use self-capacitance to detect user inputs, a shielding plate may be operably connected to the input surface. The sensing plate may be separated from the shielding plate by a spacing layer. In embodiments where the force-sensitive device may use mutual-capacitance to detect user inputs, a first sensing plate may be operably connected to the input surface and separated from a second sensing plate by the spacing layer. It should be noted that in either mutual or self capacitance embodiments, the orientation and order of the sensing plates and/or shielding plates may be varied.

In operation, as a force is applied to the input surface (e.g., due to a user pressing on the input surface), the spacing layer may vary in thickness or size. For example, the spacing layer may deform or otherwise compress. As the spacing layer changes due to the force, a gap between the two sensing plates or the sensing plate and the shielding plate may decrease, yielding an increase in capacitance at either the self-capacitance array (on the sensing plate) or between the two capacitance sensing arrays or plates.

The change in capacitance may be correlated to a decrease in distance or a change in thickness or size of the spacing layer. This change in distance may further be correlated to a force required to move the input surface the delta distance. The distance between the two sensing plates (or the sensing plate and the shielding plate) may be smallest or have a maximum reduction at a location where a user may input the force on the input surface. Using this information, the force-sensitive device may then localize the input force to a particular point or locus of points in the X-Y plane of the input device. For example, the sensed value may be provided to one or more processing units that may correlate the sensed value with an input force magnitude and location.

In some embodiments, the force-sensitive device may be incorporated into or used in conjunction with a touch-sensitive device. In these embodiments, touch inputs detected by the touch-sensitive device may be used to further refine the force input location, confirm the force input location, and/or correlate the force input to an input location. In the last example, the force-sensitive device may not use the capacitive sensing of the force-sensitive device to estimate a location, which may reduce the processing required for the force-sensitive device. Additionally, in some embodiments, a touch sensitive device may be used to determine force inputs for a number of different touches. For example, the touch positions and force inputs may be used to estimate the input force at each touch location, thereby detecting and discriminating multiple force inputs simultaneously ("multi-force").

Force-Sensitive Device and System

Figure 1B:
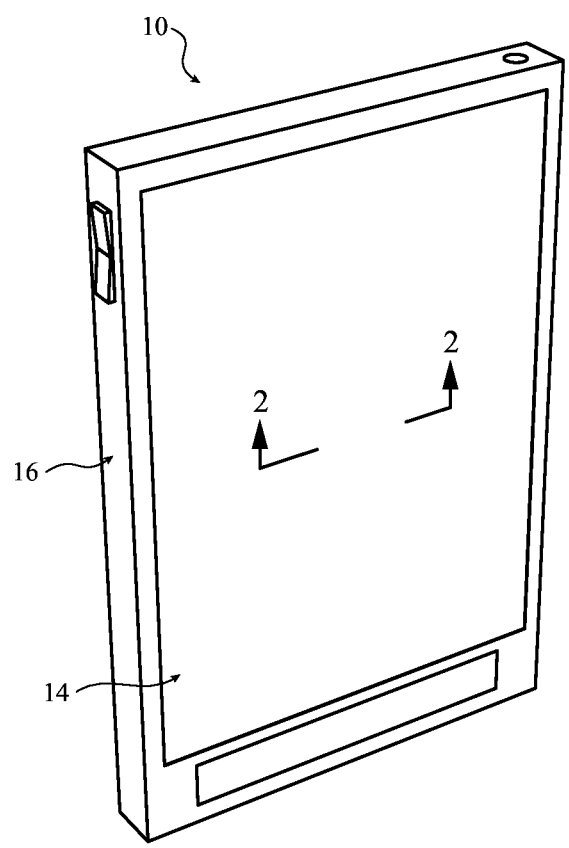
FIG. 1B is a front perspective view of a second example of a computing device incorporating a force-sensitive device.
Figure 1C:
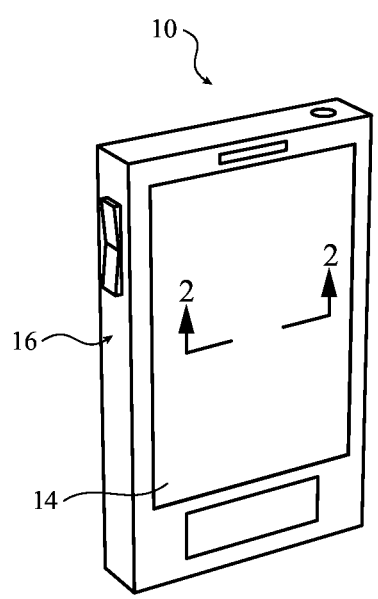
FIG. 1C is a front elevation view of a third example of a computing device incorporating the force-sensitive device.

Turning now to the figures, illustrative electronic devices that may incorporate the force-sensitive device will be discussed in more detail. FIGS. 1A-1C are cross-sectional views of a sample electronic device that may incorporate one or more force-sensitive devices, as described in more detail herein. With reference to FIG. 1A, the force-sensitive device may be incorporated into a computer 10, such as a laptop or desktop computer. The computer 10 may include a track pad 12 or other input surface, a display 14, and an enclosure 16 or frame. The enclosure 16 may extend around a portion of the track pad 12 and/or display 14. In the embodiment illustrated in FIG. 1A, the force-sensitive device may be incorporated into the track pad 12, the display 14, or both the track pad 12 and the display 14. In these embodiments, the force-sensitive device may be configured to detect force inputs to the track pad 12 and/or the display 14.

In some embodiments, the force-sensitive device may be incorporated into a tablet computer. FIG. 1B is a top perspective view of a tablet computer including the force-sensitive device. With reference to FIG. 1B, the table computer 10 may include the display 14 where the force-sensitive device is configured to detect force inputs to the display 14. In addition to the force-sensitive device, the display 14 may also include one or more touch sensors, such as a multi-touch capacitive grid, or the like. In these embodiments, the display 14 may detect both force inputs, as well as position or touch inputs.

In yet other embodiments, the force-sensitive device may be incorporated into a mobile computing device, such as a smart phone. FIG. 1C is a perspective view of a smart phone including the force-sensitive device. With reference to FIG. 1C, the smart phone 10 may include a display 14 and a frame or enclosure 16 substantially surrounding a perimeter of the display 14. In the embodiment illustrated in FIG. 1C, the force-sensitive device may be incorporated into the display 14. Similarly to the embodiment illustrated in FIG. 1B, in instances where the force-sensitive device may be incorporated into the display 14, the display 14 may also include one or more position or touch sensing devices in addition to the force-sensitive device.

Figure 2:
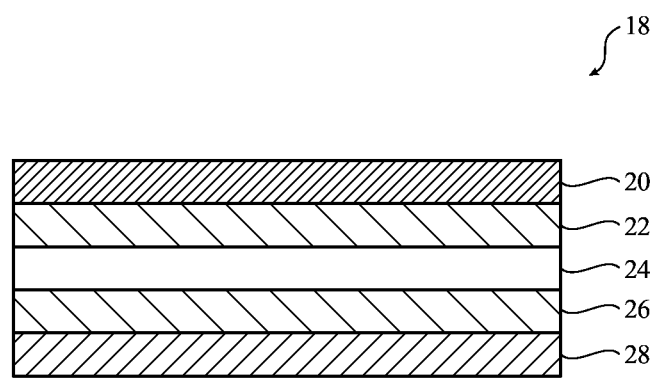
FIG. 2 is a simplified cross-section view of the computing device taken along line 2-2 in FIG. 1A.

The force-sensitive device will now be discussed in more detail. FIG. 2 is a simplified cross-section view of the electronic device taken along line 2-2 in FIG. 1A. With reference to FIG. 2, the force-sensitive device 18 may include an input surface 20, a first sensing plate 22, a spacing layer 24, a second sensing plate 26, and a substrate 28. As discussed above with respect to FIGS. 1A-1C, the input surface 20 may form an exterior surface (or a surface in communication with an exterior surface) of the track pad 12, the display 14, or other portions (such as the enclosure) of the computing device 10. In some embodiments, the input surface 20 may be at least partially translucent. For example, in embodiments where the force-sensitive device 18 is incorporated into a portion of the display 14.

The sensing plates 22, 26 may be configured to sense one or more parameters that may be correlated to an input force. For example, the sensing plates 22, 26 may include one or more capacitive sensors. It should be noted that, based on the parameter to be sensed, one of the sensing plates 22, 26 may not include any sensing elements, but may function as a shield for the other of the sensing plates 22, 26. For example, in some embodiments, the force-sensitive device 18 may utilize mutual capacitance to sense inputs to the input surface 20 and thus only a single sensing plate may be required. A shielding layer may then be used to shield the sensing plate from noise.

The spacing layer 24 or compressible gap may be positioned between the two sensing plates 22, 26 or between a single sensing plate 22, 26 and a shielding plate. The spacing layer 24 may include one or more deformable or compressible materials. The spacing layer 24 may be configured to compress or vary in at least one dimension when the input surface 20 is pressed or forced downwards by a user. In some embodiments, the spacing layer 24 may include air molecules (e.g., an air gap), foams, gels, or the like. Because the spacing layer 24 may separate the two sensing plates 22, 26 (or may separate one of the sensing plates 22, 26 from the input surface 20), as the spacing layer 24 compresses due to a user input, the distance between the two sensing plates 22, 26 (or the distance between one of the sensing plates and the input surface) varies. The variation in the separation distance may cause a correlated change in a sensed value (such as a capacitance value) by the sensing plates 22, 26. This variation may be used to estimate a user input force on the input surface.

The substrate 28 may be substantially any support surface, such as a portion of an printed circuit board, the enclosure 16 or frame, or the like. Additionally, the substrate 28 may be configured to surround or at least partially surround one more sides of the force-sensitive device 18.

FIG. 3 is a first conceptual drawing of a cross-section of a device for force sensing through capacitance changes taken along line 2-2 in FIG. 1B. As discussed briefly above, the force-sensitive device 18 may be incorporated into a mobile electronic device, examples of which include a mobile phone, computer, tablet computing device, appliance, vehicle dashboard, input device, output device, watch, and so on. Generally, measurements, dimensions, and the like provided throughout (whether within the specification or the figures) are intended to be examples only; these numbers may vary between embodiments and there is no requirement that any single embodiment have elements matching the sample dimensions and/or measurements herein. Likewise, the various views and arrangements shown in the figures are intended to show certain possible arrangements of elements; other arrangements are possible.

Figure 9:
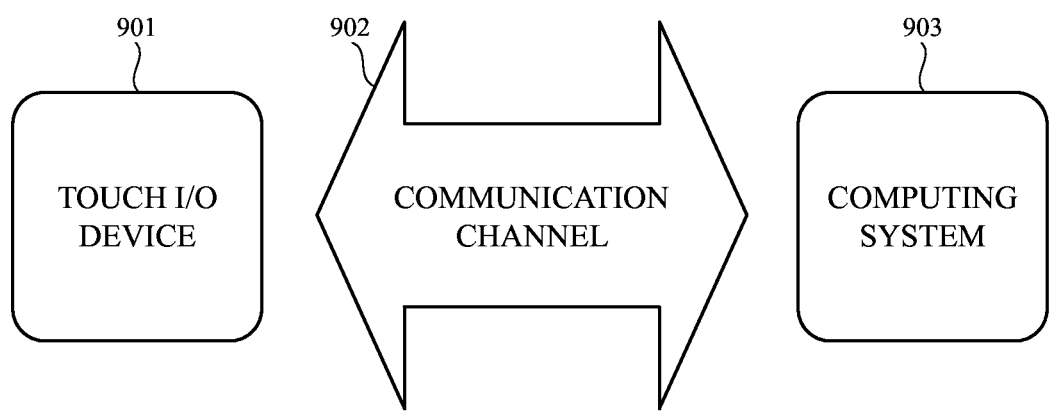
FIG. 9 shows a conceptual drawing of communication between a touch I/O device and a computing system.
Figure 10:
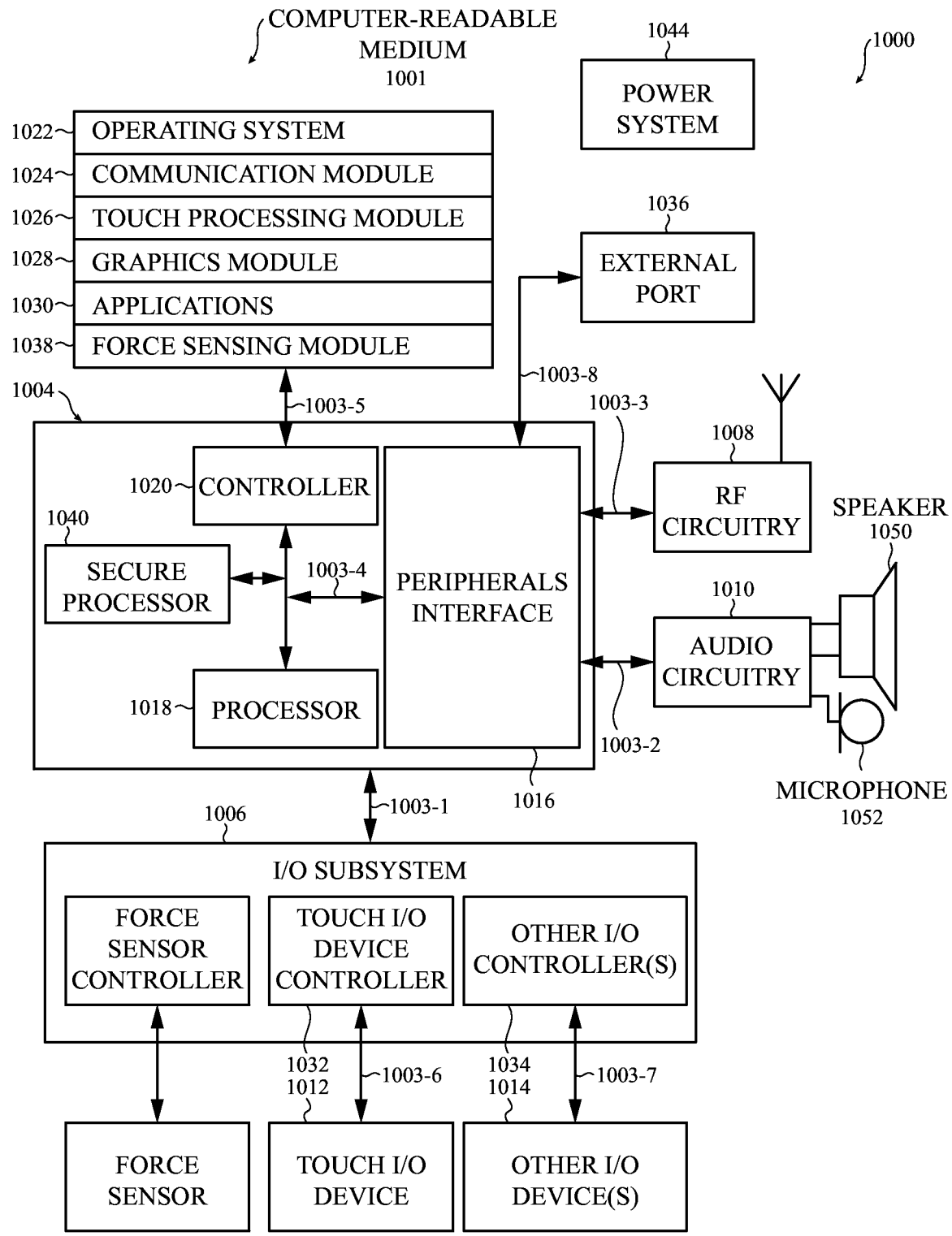
FIG. 10 shows a conceptual drawing of a system including a force-sensitive touch-sensitive device.

In one embodiment, a force-sensitive device and system can include a device frame, such as the enclosure 16, enclosing a set of circuits and data elements, as described at least in part with reference to FIG. 9 and FIG. 10. In some embodiments, the circuits and data elements can include a cover glass (CG) element, a display stack, and one or more capacitance sensing layers, such as described herein. The cover glass (CG) element and display stack can be flexible with respect to applied force. This can have the effect that the force-sensitive device can determine a measure of capacitance with respect to surface flex, and can determine an amount and location of applied force in response thereto. Essentially, as the surface of the cover glass flexes, the compressible gap (e.g., distance between the sensing plate or capacitive sensing elements) may decrease, resulting in an increase in capacitance measured at one or both of the plates/elements. This increase in capacitance may be correlated to a force that caused the surface flex, as described in more detail elsewhere herein.

In one embodiment, the cover glass element is coupled to a frame, such as the enclosure 16, for the touch-sensitive device, such as a case constructed of metal, elastomer, plastic, a combination thereof, or some other substance. In such cases, the frame for the touch-sensitive device can include a shelf on which the cover glass element is positioned above circuitry for the touch-sensitive device. For example, the frame can include a shelf on which an edge of the cover glass element is positioned, with at least some of the remainder of the cover glass element positioned over the circuitry for the touch-sensitive device. In this context, "over" the circuitry refers to being positioned above the circuitry when the display for the touch-sensitive device is positioned for a user above the touch-sensitive device.

Figure 3A:
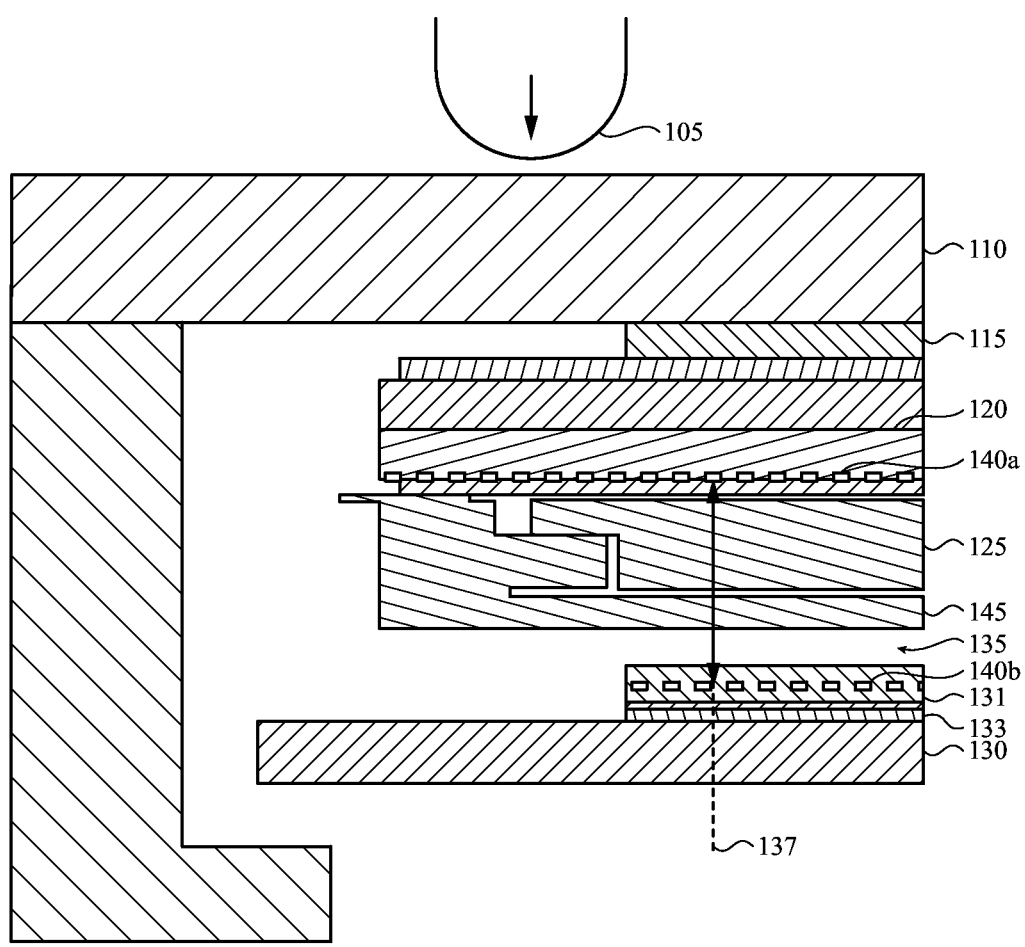
FIG. 3A is a cross-section view of the force-sensitive device taken along line 3-3 in FIG. 1B.

With reference to FIG. 3A, in one embodiment, a user contacts a device, such as when a user's finger 105, or other object, applies force (shown with reference to an arrow in FIG. 1), to a cover glass element 110, the input surface 20, or other element of the device. For example, as described herein, the user's finger 105 can apply force to the cover glass element 110 at one or more locations in which the cover glass element 110 also has a touch sensor (not shown), or can apply force to the cover glass element 110 at one or more locations in which the cover glass element 110 does not have a touch sensor.

In one embodiment, the cover glass element 110 includes a relatively translucent or transparent (in most locations) substance capable of isolating circuitry for the touch-sensitive device from ambient objects. For example, glass, treated glass, plastic, diamond, sapphire, and other materials can serve as such substances. In one embodiment, the cover glass element 110 is positioned above the device circuits, including an adhesive layer 115. In some embodiments, the edge of the adhesive layer 115 may mark an edge of the visible portion of the display.

In one embodiment, the adhesive layer 115 is substantially translucent or transparent. This can have the effect of allowing a set of display circuits to provide a display to the user, without interference. In one embodiment, the adhesive layer 115 is positioned above a set of display circuits 120.

In one embodiment, the display circuits 120 provide a display to the user, such as a GUI or an application program display, although it should be appreciated that some portion of the display circuits 120 are dedicated to integrated circuitry that is typically not visible to a user and does not provide any output visible by a user. Such an area may be, for example, to the left of the edge of the adhesive layer 115 (with respect to the orientation of FIG. 3A). In one embodiment, the display circuits 120 are positioned above a back light unit (BLU) 125.

In one embodiment, the back light unit 125 provides a back light for the display circuits 120. A support structure 145 may support the back light unit 125 and/or the display circuits 120.

In one embodiment, the device can include a compressible gap 135 or spacing layer that is part of a larger sensing gap 137 defining a distance between the two capacitive sensing elements 140a, 140b. For example, the compressible gap 135 can include an air gap, a gap at least partly filled with a compressible substance (such as a substance having a Poisson's ratio of less than about 0.48), or a gap at least partly filled with a compressible structure.

As shown in FIG. 3A, an applied force (shown with respect to the arrow) can cause the cover glass element 110 or other device element to exhibit surface flex. This can have the effect that one or more elements in the device are brought closer together in response to the applied force. As described herein, a force sensor that detects or measures one or more capacitive changes can determine an amount and location of that applied force based on those capacitive changes.

In short, a force sensor may include one or more force-sensitive elements, such as a capacitive sensor.

In one embodiment and returning to FIG. 3A, the compressible gap 135 or sensing gap can be positioned in one or more of several positions in the device. For some examples: (A) The compressible gap 135 can be positioned above the display circuits 120, such as below the cover glass element 110, below the adhesive layer 115, and above the display circuits 120; (C) the compressible gap 135 can be positioned below at least a portion of the display circuits 120, such as below a polarizer element, as described herein. In such cases, the polarizer can be a part of the display circuits; and (B) the compressible gap 135 can be positioned below the back light unit 125 and above the midplate 130. It should be appreciated that a compressible gap may be located elsewhere in the device, and so the foregoing are merely examples of locations.

In one embodiment, the force sensor can include one or more capacitance sensing elements 140a and 140b, disposed to determine an amount of capacitance change in response to surface flex. The capacitance sensing element 140a and 140b can include either mutual capacitance or self-capacitance features, as described herein. In cases in which the capacitance sensing element 140a and 140b includes mutual capacitance features, the capacitance sensing element 140a and 140b can be disposed in drive/sense rows/columns, as described herein. Thus, capacitance sensing elements may be arranged in a variety of configurations, including linearly, in an array, or at irregular intervals. References to a "capacitive sensing element" herein are generally meant to encompass multiple capacitive sensing elements in an appropriate configuration, as well.

Figure 3B:
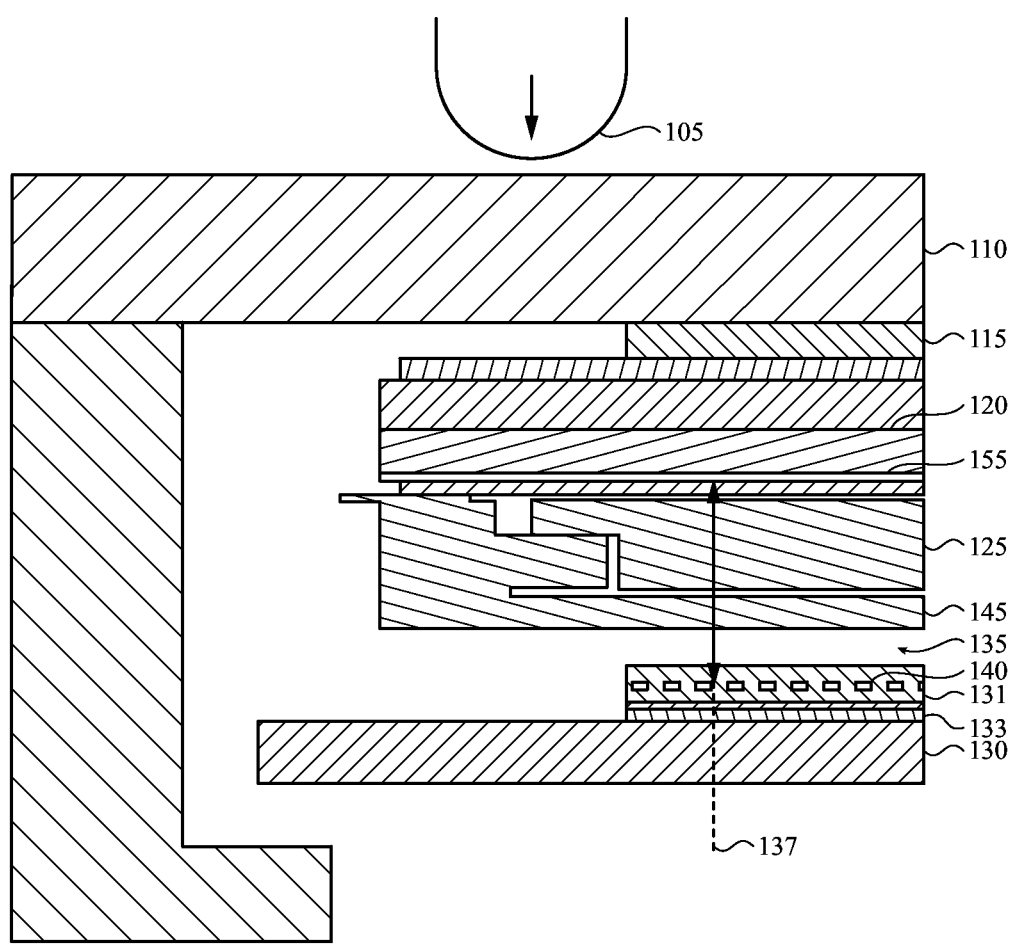
FIG. 3B is a cross-section view of an alternative embodiment of the force-sensitive device taken along line 3-3 in FIG. 1B.
Figure 3C:
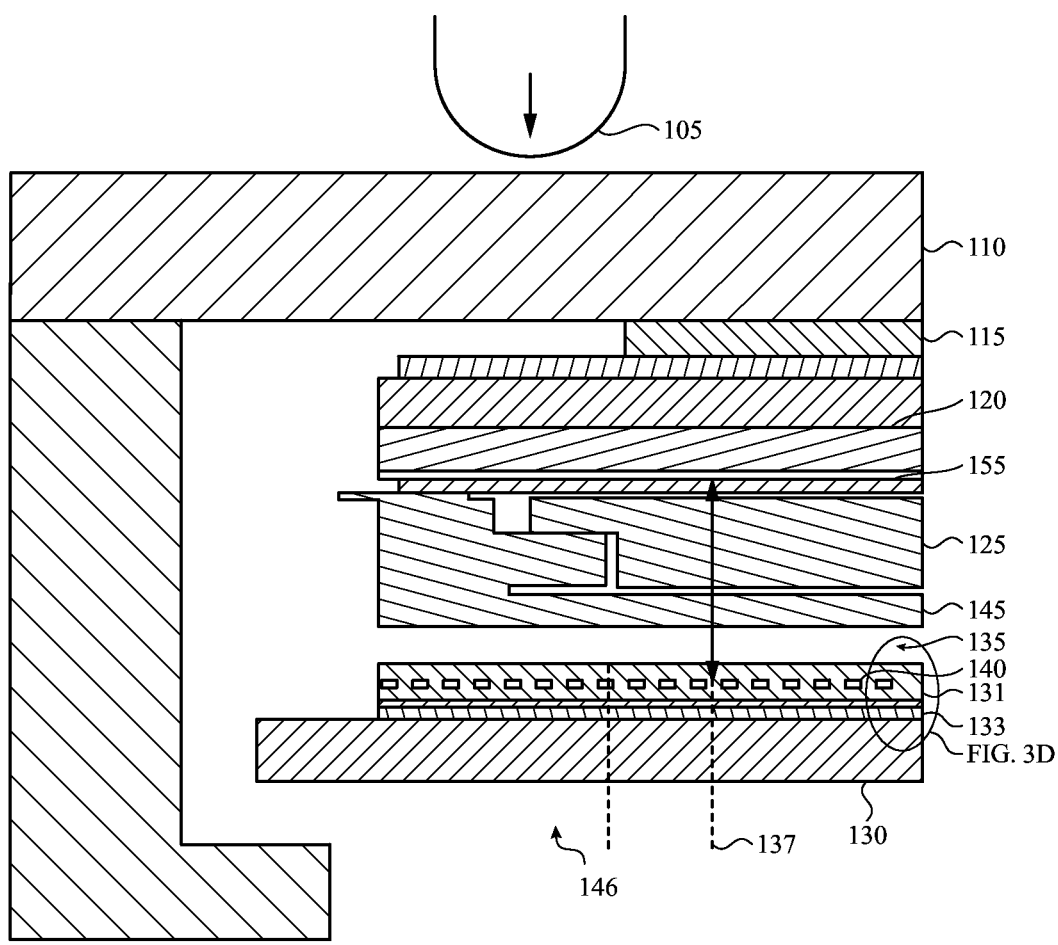
FIG. 3C is a cross-section view of still another alternative embodiment of the force-sensitive device taken along line 3-3 in FIG. 1B.

Further, although certain figures (such as FIGS. 3A and 3B) depict the capacitive sensing elements as terminating at an edge of a visible display, it should be appreciated that the capacitive sensing element may extend into a border region, beyond an edge of the visible display, to provide force sensing in such a region. As shown, the capacitive sensing elements 140 extend into a border region 146. FIG. 3C shows such an embodiment. Generally, the visible portion of the display ends at or near the edge of adhesive layer 115.

In some embodiments, the capacitance sensing element 140a and 140b can include at least portions that are substantially opaque or translucent or transparent, as described herein. In cases in which at least a portion of the capacitance sensing element 140a and 140b is positioned above the back light unit 125, those portions are substantially translucent or transparent.

Generally, in one embodiment approximately 100 grams of force applied to the front of the cover glass may cause the sensing gap 137 between elements 140a and 140b to reduce in dimension by approximately 1.6 micrometers. Likewise, an upward or outward force applied to the cover glass may cause the sensing gap 137 to increase in dimension. It should be appreciated that the exact ratio of force to change in sensing gap 137 may vary between embodiments, and the numbers provided herein are meant purely as one example. It should also be appreciated that the sensing gap 137 may include intermediate elements between the sensing elements 140a and 140b; that is, the entire gap may not be solely air.

Regardless, as the sensing gap 137 decreases, the capacitive sensing elements move closer to one another and thus the capacitance measured between the elements 140a, 140b may increase. In a mutual capacitance system employing multiple planes of capacitive sensing elements, as shown in FIG. 3A, this change in the mutual capacitance may result from a change in the distance between two capacitive sensing elements, for example due to a surface flex of the cover glass or other surface on which a force is exerted. Accordingly, as the distance changes with the force exerted on the cover glass, the change in mutual capacitance may be correlated to a force exerted to create the change in distance/surface flex.

In one embodiment, the force sensor can include a piezoelectric film (not shown). This can have the effect that the piezoelectric film generates an electric charge (or other electromagnetic effect) in response to surface flex. This can have the effect that the capacitance sensing element 140a and 140b can sense any change in the electric charge and determine an amount and location of surface flex. This can have the effect that the force sensor can determine an amount and location of applied force providing that surface flex.

In one embodiment, the amount and location of surface flex can be distributed with respect to the surface of the device, such as with respect to a usable surface of the cover glass element 110, and can be responsive to one or more locations where applied force (such as by the user's finger) is presented to the surface of the device. At least one example of a "heat map" of surface flex is shown with respect to FIG. 5.

In one embodiment, the capacitance sensing element 140a and 140b can be integrated into a device circuit that is disposed for touch sensing. This would have the effect that circuits for detection and measurement of applied force can integrated together with circuits for detection of touch.

SELF-CAPACITANCE. It should be appreciated that either of the capacitive sensing elements 140a, 140b may be replaced with a ground or shield layer. By replacing either of the capacitive sensing elements with a shield layer, the device may employ a self-capacitive force sensor. FIG. 3B illustrates such an embodiment. As shown, capacitive sensing elements 140 may be positioned at or adjacent a midplate 130 or other support structure that is relatively immobile with respect to a frame or enclosure of the electronic device. For example, the element may be placed on a graphite layer or other substrate 133 and/or a within flexible circuit 131, affixed to the midplate. It should be appreciated that the capacitive sensing elements need not be placed within a flexible circuit 131, although this is shown in FIG. 3B and discussed in more detail below with respect to FIG. 3D. Each capacitive sensing element 140 may measure its capacitance with respect to the ground layer 155.

Forces exerted on the cover glass element 110 will generally cause the display stack beneath the glass to move downward, at least to a small extent. Accordingly, distance between the ground layer 155 and the capacitive sensing element 140a may decrease, which in turn may cause the capacitance measured by the capacitive sensing element to increase. Likewise, as a force is removed from the cover glass, the ground layer 155 may move away from the capacitive sensing element 140 and so the measured capacitance may decrease. These changes in capacitance are generally due to the force exerted on the cover glass, for example by a user's finger 105. Accordingly, embodiments employing a self-capacitive sensing system, as shown generally in FIG. 1B, may correlate the capacitance measured at any given capacitive sensing element 140 to a particular force exerted on the cover glass.

In addition, the ground layer 155 may shield the capacitive sensing element from external noise, cross-talk and parasitic capacitances. The ground layer may be passive or actively driven to a voltage, depending on the embodiment.

In other embodiments, the positions of the ground layer 155 and the capacitive sensing element 140 may be reversed, such that a force exerted on the cover glass may move one or more capacitive sensing elements while the ground plane remains immobile. Otherwise, operation of such an embodiment is generally the same as has been previously described.

Although embodiments have been discussed with respect to a display and a cover glass, it should be appreciated that alternative embodiments may omit one or both elements. For example, the cover glass may be replaced by a trackpad surface and the display stack may be omitted, while the ground layer is affixed to an underside of the trackpad surface. Such an embodiment would operate to measure (or more precisely, estimate) force exerted against the surface of the trackpad.

Arrangement of Capacitive Sensing Elements.

Figure 3D:
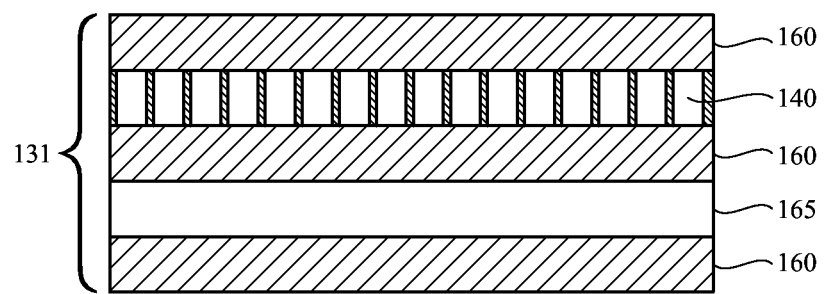
FIG. 3D is an expanded, cross-section view of the detail area of FIG. 3C, showing details of a sample flexible substrate in which certain capacitive sensing elements may be placed.

FIG. 3D is an expanded, schematic cross-section view of a portion of FIG. 3C, generally showing certain details of a flexible substrate in which one or more capacitive sensing elements 140 may be located. It should be appreciated that the capacitive sensing elements 140 are generally analogous to elements 140a, 140b; in some embodiments the structure shown in FIG. 3D may be used with either or both sets of capacitive sensing elements 140a, 140b. Likewise, this structure may be employed in substantially any embodiment discussed herein.

A flexible circuit 131 may be formed of a variety of layers, as generally shown in FIG. 3D. One or more support layers 160 may define various regions of the flexible circuit 131. These support layers may form, for example, a top and bottom surface of the flexible circuit, as well as an inner layer. In certain embodiments, the support layers may be formed from a dielectric material and are typically flexible. It should be appreciated that the support layers may be of varying dimensions or may all have the same or similar dimensions.

An array of capacitive sensing elements 140 may be disposed between two support layers 160 of the flexible circuit 131. For example and as shown in FIG. 3D, the capacitive sensing elements may be placed between the top and middle support layers. A shield 165 may be positioned between the middle and lower support layers 160. The shield may partially or fully insulate the capacitive sensing elements 140 from noise, crosstalk, parasitic capacitances, and the like.

In some embodiments, the positions of the shield 165 and the array of capacitive sensing elements 140 may be reversed. For example, if the flexible circuit is located beneath the display 120, such as beneath and adjacent to a thin-film transistor layer patterned on a bottom of the display, the shield 165 may occupy the upper cavity or open layer within the flexible circuit and the capacitive sensing elements 140 may occupy the lower cavity or open layer. This arrangement may be used with the capacitive sensing elements 140b, as one example.

Figure 3E:
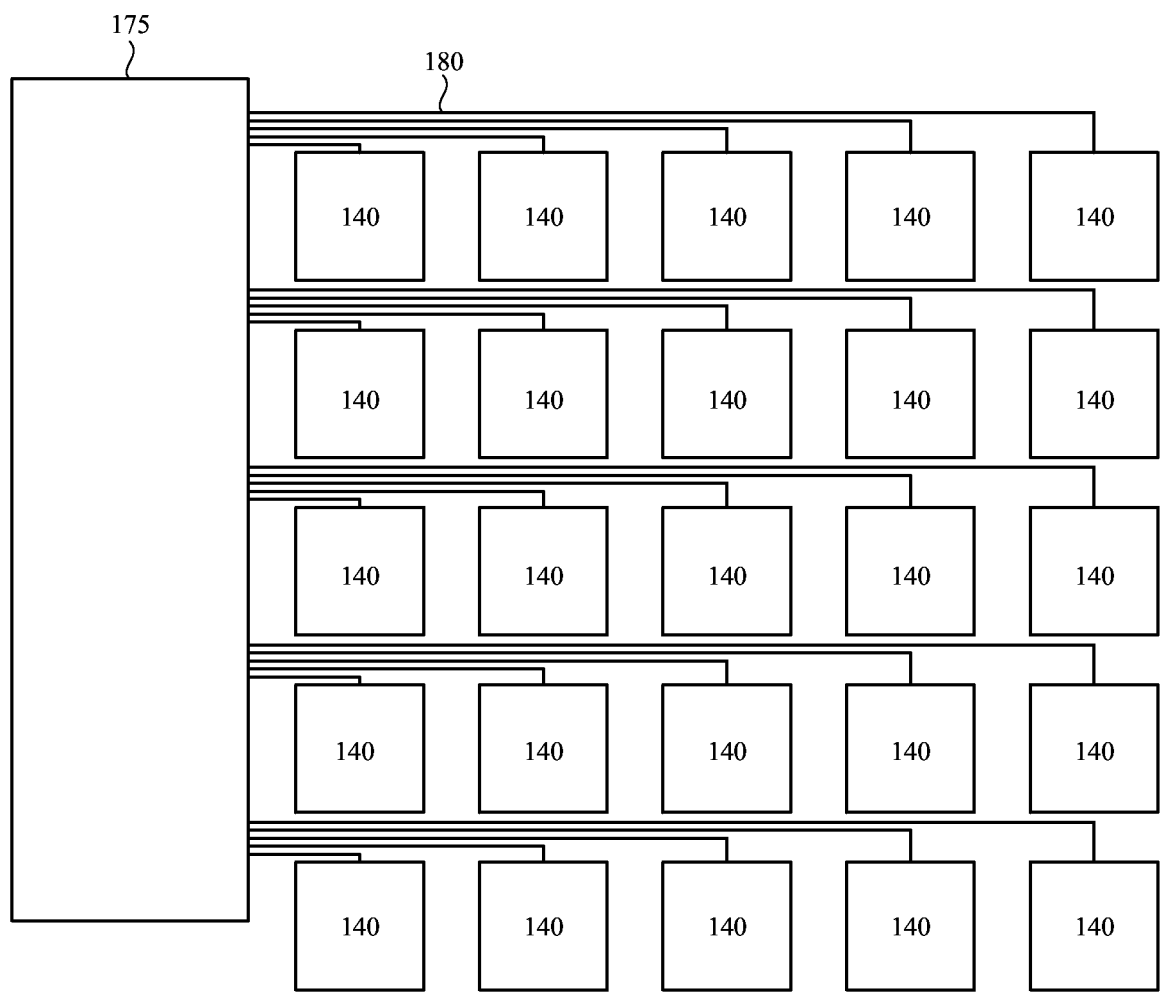
FIG. 3E is a simplified top view of an array of capacitive sensing elements, as may be used by various embodiments.

FIG. 3E is a top view of a sample array of capacitive sensing elements 140. It should be appreciate that FIG. 3E is not to scale and intended to be illustrative only.

Generally, the capacitive sensing elements 140 may be arranged in an array (here, shown as a grid) of any desired shape and/or size. Each capacitive sensing element 140 is connected by its own dedicated signal trace 180 to an integrated circuit 175 that receives the output of the capacitive sensing element and may, for example process that output in order to correlate the output to a force exerted on a cover glass or other surface. The integrated circuit 175 may include one or more processing units to perform such operations, for example. It should be appreciated that the integrated circuit 175 may be located remotely from the capacitive sensing array and may be displaced therefrom substantially along any axis. Accordingly, the positioning of the integrated circuit 175 is provided only for purposes of example.

The array of capacitive sensing elements may be placed in the position or positions shown by capacitive sensing elements 140a, 140b in FIGS. 3A-3C and likewise anywhere else a capacitive sensing element is shown or discussed in this document.

Each capacitive sensing element 140 effectively functions to sense a change in capacitance due to a surface flex directly above its area. As previously mentioned, this change in capacitance may be correlated to a force, which in turn may be used as an input for an electronic device. Generally, the resolution of the array to a force may be varied by varying the spacing between capacitive sensing elements 140, varying the size of the elements, or both. It should be appreciated that there is no requirement that the spacing between elements and/or the size of the elements remain constant in any embodiment. Thus, some embodiments may have regions where the capacitive sensing elements are smaller and/or positioned closer together than in other regions. This may provide a surface for an electronic device that has variable resolution of force across its area.

Capacitance Sensing Elements

Figure 4A:
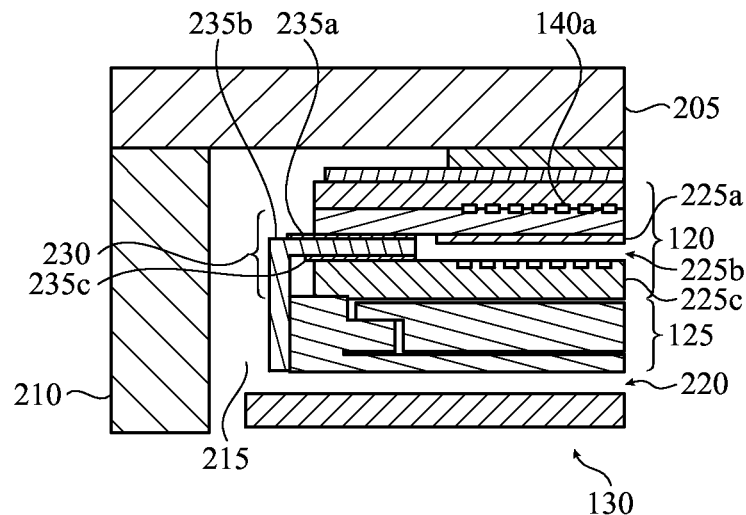
FIG. 4A shows a first conceptual drawing of a portion of a device for force sensing through capacitance changes.

FIG. 4A shows another conceptual cross-section drawing of a portion of a device for force sensing through capacitance changes. In the embodiments of FIGS. 4A-4D, both capacitive sensing elements may be integrated into a display stack, but generally may operated in fashions similar to those previously described. Further, although the embodiments of FIGS. 4A-4D may generally be described with respect to a mutual capacitive arrangement, either of the capacitive sensing elements 140a, 140b may be replaced with a ground layer or shield layer.

In one embodiment, a device for force sensing can include the cover glass element, a first frame element 205, a second frame element 210, a first clearance gap 215, the display circuits 120, the back light unit 125, a second clearance gap 220, and the midplate 130. The first frame element 205 can be disposed at an edge (such as, around a perimeter) of the device, with the effect of supporting the elements of the device. The second frame element 210 can be positioned at an edge (such as, around a perimeter) of the cover glass element 110, with the effect of supporting the cover glass element 110. The first clearance gap 215 can be positioned around a perimeter of the cover glass element 110, with the effect of providing an amount of clearance around a perimeter of the display circuits 120. The second clearance gap 220 can be positioned between the back light unit 125 and the midplate 130, with the effect of providing an amount of clearance below the cover glass element 110, such as to provide for surface flex. As noted above, the second clearance gap 220 can be compressible, such as including a compressible gap (e.g., the compressible gap 135), a gap at least partly filled with a compressible substance, or a gap at least partly filled with a compressible structure, as described herein.

In one embodiment, the display circuits 120 can include a polarizer 225a, which can be positioned below the cover glass element 110 and have a thickness of approximately 70 microns (although it is possible for the polarizer 225a to have a substantially different thickness, such as about 150 microns). The display circuits 120 can include an internal compressible gap 225b (such as may comprise the compressible gap 135), which can be positioned below the polarizer 225a and have a thickness of approximately 150 microns. The display circuits 120 can include a single-layer indium tin oxide ("SITO") layer 225c. In some embodiments, the SITO may be positioned below the internal compressible gap 225b and above the back light unit 125. In other embodiments, dual-layer indium tin oxide ("DITO") may be used instead of SITO.

In one embodiment, the display circuits 120 can include a spacer element 230, positioned to a side of the internal compressible gap 225b. The spacer element 230 can include a first adhesive layer 235a, a metal L-frame 235b, and a second adhesive layer 235c. The first adhesive layer 235a can be positioned below circuit structures that are just above the display circuits 120, and can have a thickness of approximately 25 microns. The metal L-frame 235b can be positioned below the first adhesive layer 235a, and can have a thickness of approximately 170 microns. The second adhesive layer 235c can be positioned below the metal L-frame 235b and above the SITO layer 225c, and can have a thickness of approximately 25 microns. The spacer element 230 can have the effect of disposing elements above and below the spacer element 230 so that the internal compressible gap 225b remains open to the possibility of surface flex.

In one embodiment, the capacitance sensing element 140a and 140b can be positioned above and below the internal compressible gap 225b, respectively. A top capacitive sensing element 140a can be positioned above the polarizer 225a, while the bottom layer of the capacitive sensing element 140b can be positioned below the internal compressible gap 225b and above the SITO layer 225c. As described above, the capacitance sensing element 140a and 140b can be disposed to use indium tin oxide (ITO), and can be disposed to provide a signal using either mutual capacitance or self-capacitance.

For a first example, in cases in which the capacitance sensing element 140a and 140b is disposed to use mutual capacitance, the capacitive sensing element 140a and the capacitive sensing element 140b can be disposed to use driving elements and sensing elements respectively. In such cases, the capacitive sensing element 140a can include the driving elements, while the capacitive sensing element 140b would include the sensing elements, or the reverse. In such cases, the driving elements can include a set of rows of electrodes and the sensing elements can include a set of columns of electrodes, or the reverse. In cases in which driving elements and sensing elements are disposed in rows and columns, the rows and columns can intersect in a set of force sensing elements, each of which is responsive to applied force in a region of the cover glass element 110. The force-sensitive region may be of any shape or size.

Figure 4B:
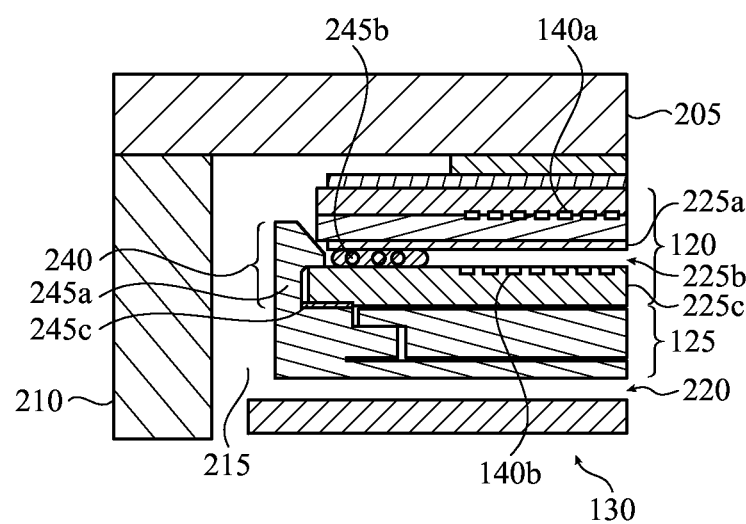
FIG. 4B shows a second conceptual drawing of a portion of a device for force sensing through capacitance changes.

FIG. 4B shows a second conceptual cross-section drawing of a portion of a device for force sensing through capacitance changes. Generally, FIG. 4B depicts an embodiment having a second spacer element 240 in lieu of the aforementioned metal L-frame 235b, as well as a different structure for connecting certain elements of the display circuits 120.

In one embodiment, a device for force sensing can include the cover glass element, the first frame element 205, the second frame element 210, the first clearance gap 215, the second clearance gap 220, the display circuits 120, the back light unit 125, and the midplate 130. The first frame element 205, second frame element 210, first clearance gap 215, and second clearance gap 220 can be disposed as described with respect to FIG. 4A.

In one embodiment, the display circuits 120 can include the polarizer 225a, the internal compressible gap 225b, and the capacitance sensing element 140a and 140b. The polarizer 225a, the internal compressible gap 225b, and the capacitance sensing element 140a and 140b can be disposed as described with respect to FIG. 4A.

In one embodiment, the device can include a second spacer element 240, also positioned to a side of the internal compressible gap 225b. The second spacer element 240 can include a snap element 245a, an adhesive spacer 245b, and a ring tape 245c. The snap element 245a can include a set of snaps coupled to a P-chassis of the device (see, e.g., FIG. 4C). The adhesive spacer 245b can include a silicone rubber adhesive in which are disposed a set of plastic spacer balls. For example, the silicone rubber adhesive can be positioned in the region of the internal compressible gap 225b. The ring tape 245c can be positioned below the snap element 245a and above the back light unit 125.

In one embodiment, the capacitance sensing element 140a and 140b can be positioned above and below the internal compressible gap 225b, respectively. A capacitive sensing element 140a can be positioned above the polarizer 225a, while a capacitive sensing element 140b can be positioned below the internal compressible gap 225b and above the SITO layer 225c, as described with respect to FIG. 4A.

Figure 4C:
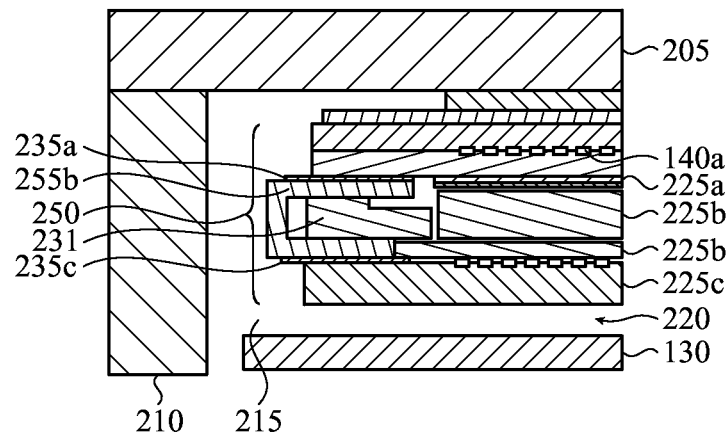
FIG. 4C shows a third conceptual drawing of a portion of a device for force sensing through capacitance changes.

FIG. 4C shows a third conceptual cross-section drawing of a portion of a device for force sensing through capacitance changes.

In one embodiment, a device for force sensing can include the cover glass element, the first frame element 205, the second frame element 210, the first clearance gap 215, the second clearance gap 220, the display circuits 120, the back light unit 125, and the midplate 130. The first frame element 205, second frame element 210, first clearance gap 215, and second clearance gap 220 can be disposed as described with respect to FIG. 4A.

In one embodiment, the display circuits 120 can include the polarizer 225a, the internal compressible gap 225b, and the capacitance sensing element 140a and 140b. The polarizer 225a, the internal compressible gap 225b, and the capacitance sensing element 140a and 140b can be disposed as described with respect to FIG. 4A.

In one embodiment, the device can include a third spacer element 250, also positioned to a side of the internal compressible gap 225b. The third spacer element 250 can include the first adhesive layer 235a, a metal U-frame 255b, and the second adhesive layer 235c. The first adhesive layer 235a can be positioned as described with respect to FIG. 4A. The second adhesive layer 235c can be positioned above the SITO layer 225c and can have a thickness of approximately 25 microns. The metal U-frame 255 can be positioned below the first adhesive layer 235a and above the second adhesive layer 235c, and can have an upper portion disposed as the metal L-frame 235b is described with respect to FIG. 4A, and a lower portion disposed positioned above the SITO layer 225c.

In one embodiment, with respect to the capacitance sensing element 140a and 140b, the back light unit 125 can include a set of films that can be positioned between the capacitive sensing element 140a and the capacitive sensing element 140b, and can include a set of multiple internal compressible gaps 225b (which collectively comprise a single internal compressible gap 225b). The multiple internal compressible gaps 225b can be distributed throughout the back light unit 125 and can have a total thickness of approximately 100 microns to 200 microns.

In one embodiment, the capacitance sensing element 140a and 140b can be positioned above and below the back light unit 125 and the multiple internal compressible gaps 225b, respectively. A capacitive sensing element 140a can be positioned above the polarizer 225a, while a capacitive sensing element 140b can be positioned below the multiple internal compressible gaps 225b and above the SITO layer 225c.

Figure 4D:
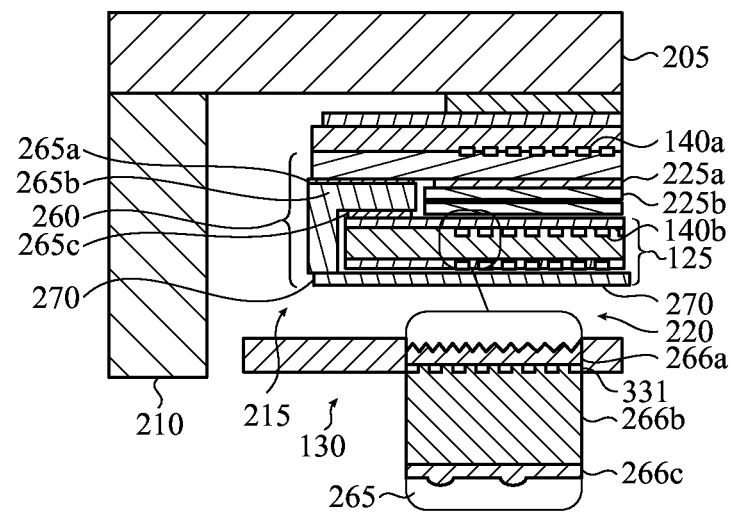
FIG. 4D shows a fourth conceptual drawing of a portion of a device for force sensing through capacitance changes.

FIG. 4D shows a fourth conceptual cross-section drawing of a portion of a device for force sensing through capacitance changes.

In one embodiment, a device for force sensing can include the cover glass element 110, the first frame element 205, the second frame element 210, the first clearance gap 215, the second clearance gap 220, the display circuits 120, the back light unit 125, and the midplate 130. The first frame element 205, second frame element 210, first clearance gap 215, and second clearance gap 220 can be disposed as described with respect to FIG. 4A.

In one embodiment, the display circuits 120 can include the polarizer 225a, the internal compressible gap 225b, and the capacitance sensing element 140a and 140b. The polarizer 225a, the internal compressible gap 225b, and the capacitance sensing element 140a and 140b can be disposed as described with respect to FIG. 4C.

In one embodiment, the back light unit 125 can include a set of films that can be positioned between the capacitive sensing element 140a and the capacitive sensing element 140b, and can include a set of multiple internal compressible gaps 225b (which collectively comprise the internal compressible gap 225b), as described with respect to FIG. 4C. The multiple internal compressible gaps 225b can be distributed throughout the back light unit 125 and can have a total thickness of approximately 100 microns to 200 microns, as described with respect to FIG. 4C.

In one embodiment, the device can include a fourth spacer element 260, also positioned to a side of the internal compressible gap 225b. The fourth spacer element 260 can include the first adhesive layer 235a, a second metal L-frame 265, and the second adhesive layer 235c. The first adhesive layer 235a can be positioned as described with respect to FIG. 4A. The second adhesive layer 235c can be positioned above the back light unit 125 and can have a thickness of approximately 25 microns. The second metal L-frame 255 can be positioned below the first adhesive layer 235a and above the second adhesive layer 235c, and can be disposed as the metal L-frame 235b is described with respect to FIG. 4A.

In one embodiment, the back light unit 125 can include a layered structure 265 and a reflector film 270. The layered structure 265 can include a first dispersing element 266a, backlight glass element 265b, and a second dispersing element 266b. The first dispersing element 266a can include a rough-surfaced substantially translucent or transparent substance having a thickness of approximately 100 microns. The backlight glass element 265b can include a substantially translucent or transparent substance having a thickness of approximately 300 microns, such as glass, or such as any of the substances used for the cover glass element 110. The second dispersing element 266b can include a substantially translucent or transparent substance having a thickness of approximately 100 microns, and having multiple (such as periodic or aperiodic) bumps that can aid in dispersing light. In some implementations, the backlight glass element 265b may include patterned indium tin oxide (ITO) 331 or other conductive coating. The reflector 270 can include a reflective substance.

In one embodiment, the capacitance sensing element 140a and 140b can be disposed that the capacitive sensing element 140b is disposed in the back light unit 125. For a first example, the capacitive sensing element 140b can be integrated into the back light unit 125 as one or more laminated circuits, such as features of a light guide panel ("LGP"). The laminated circuits can be positioned in one or more ways: (A) The laminated circuits can be positioned below the first dispersing element 266a and above the backlight glass element 265b. (B) The laminated circuits can be positioned by dividing the backlight glass element 265b into two or more pieces, and depositing the laminated circuits between the two or more pieces. (D) The laminated circuits can be positioned by depositing them on a surface of the first dispersing element 266a. In such cases, the laminated circuits would be deposited on top of the rough surface of the first dispersing element 266a. (C) The laminated circuits can be positioned by depositing them on a surface of the first dispersing element 266a, but with smooth pathways cut into the first dispersing element 266a so that the laminated circuits are deposited on those smooth pathways.

Figure 4E:
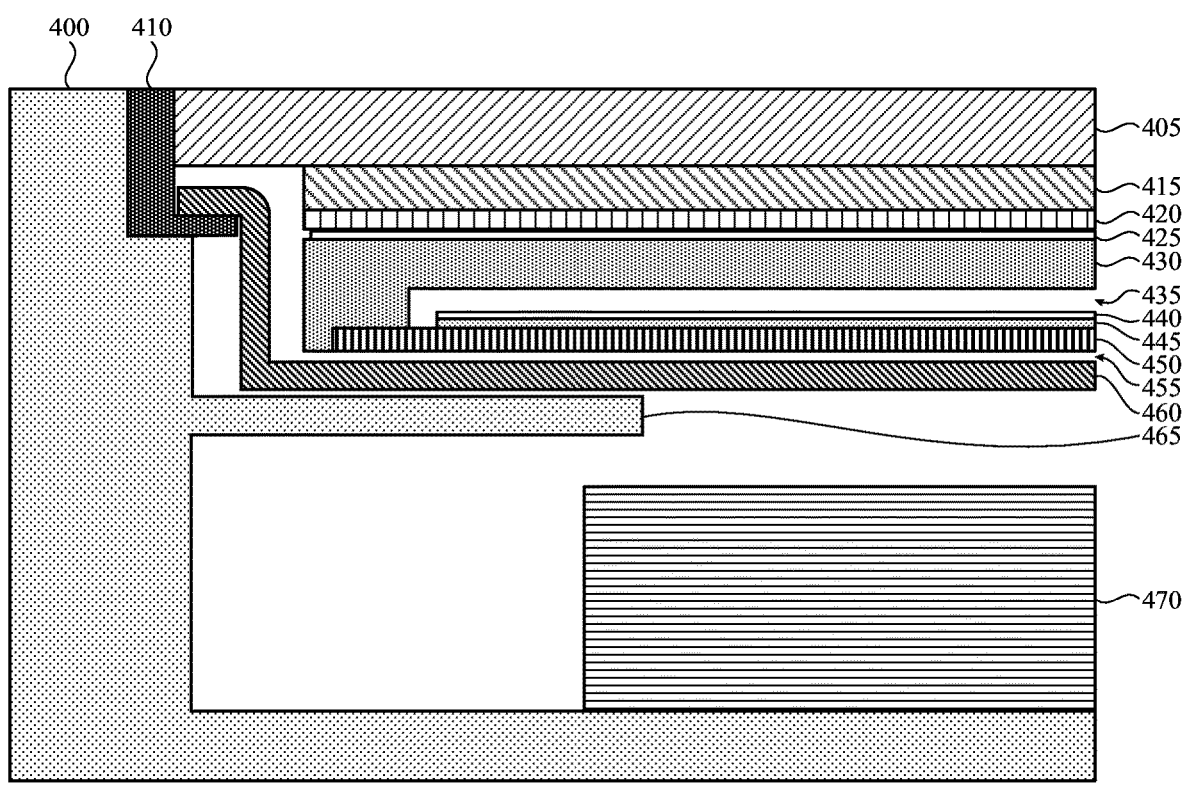
FIG. 4E depicts a cross-sectional view of yet another embodiment of a portion of a device capable of sensing changes in an applied force.

FIG. 4E depicts a cross-sectional view of yet another embodiment of a portion of a device capable of sensing changes in an applied force. As shown in FIG. 4E, an exterior of the device may be defined by a cover glass 405, a housing 400, and (in some embodiments) a spacer 410 or other support. The spacer 410 may permit motion of the cover glass 405 with respect to the housing 400, and may also serve as an environmental seal to prevent ingress of foreign matter into the interior of the electronic device.

A display stack 415 may be positioned beneath, and affixed to, the cover glass 405. The display stack 415 may include a number of individual elements, layers, circuits and the like, including, but not limited to, a liquid crystal display or organic light emitting diode display, front and rear polarizers, a color filter layer, and so on. In some embodiments, the display stack may also contain touch-sensing components for sensing a location of a touch on the cover glass 405. The display stack may be affixed to the cover glass 405 by an optically clear adhesive (not shown). Alternately, the display stack may abut, but not be affixed to, the cover glass in certain embodiments. Typically, the cover glass 405 and display stack abut one another or are affixed to one another to facilitate the transfer of a force exerted on the cover glass through the display stack and to the first capacitive sensing element 420. A gap between the cover glass and display stack may prevent certain forces from passing through the display stack, insofar as the cover glass may not deflect sufficiently to impact and flex the display stack 415. Likewise, a gap between the two may cause diffusion of a force exerted on the cover glass 405, and thus inaccurate sensing of force by the capacitive sensing elements 420, 440.

A first capacitive sensing element 420 may be deposited on an underside of the display stack 415. The first capacitive sensing element may be an array of individually-driven electrodes, as described elsewhere herein, or may be a series of rows and/or columns of electrodes formed of an electrically-conductive material. In one embodiment, the first capacitive sensing element 420 may be formed from ITO. In other embodiments, the first capacitive sensing element may be formed from a metallic nanowire, such as silver nanowire, or any other optically-transparent or near-transparent material.

A first adhesive layer 425 connects the first capacitive sensing element 420 and display stack 415 to a back light unit 430. In some embodiments, the position of the first capacitive sensing element 420 and first adhesive layer may be switched. For example, the first capacitive sensing element 420 may be deposited on the back light unit 430 and affixed to the display stack by the first adhesive layer. The first adhesive layer 425 is generally an optically clear adhesive, although this may vary between embodiments.

In other embodiments, the back light unit 430 may be omitted. A back light unit 430 may not be used with certain types of displays, such as an OLED display. In such embodiments, a support structure may be positioned approximately where the back light unit 430 is shown. In alternative embodiments, a support structure may connect the sensor plate 450 to the display stack, or the sensor plate 450 may extend to connect to the display stack 415. The sensor plate 450 is described in more detail below.

A compliance gap 435 separates the back light unit 430 from a second capacitive sensing element 440. The compliance gap may be an air gap in certain embodiments; in other embodiments the compliance gap may be filled with a gel or other compliant substance that deforms when force is exerted on the cover glass 405, and returns to its initial dimensions when the force ceases. Optionally, any material within or forming the compliance gap 435 may be optically transparent or near-transparent.

The second capacitive sensing element 440 is positioned beneath the compliance gap 435 and affixed to the sensor plate 450 by a second adhesive layer 445, which may be formed from any suitable adhesive. The structure of the second capacitive sensing element 440 is chosen to complement the structure of the first capacitive sensing element 420. For example, if the first capacitive sensing element 420 is an array of individual sensors, the second capacitive sensing element 440 may be the same, may be a ground layer, or may be a common voltage layer. If the first capacitive sensing element 420 is a series of electrically-conductive columns of electrodes, the second capacitive sensing element 440 may take the form of a series of electrically-conductive rows of electrodes set at one or more angles to the columns. The operation of the first and second capacitive sensing elements 420, 440 is set forth briefly below, and in more detail elsewhere herein.

In one embodiment, the first capacitive sensing element 420 is a drive element and the second capacitive sensing element 440 is a sense element. This may be reversed in other embodiments.

The sensor plate 450 is affixed to the back light unit 430. Generally, the back light unit 430 is relatively stiff and does not deflect or move to the extent that the cover glass 405, display stack 415 and first capacitive sensing element 420 do when a force is exerted on the cover glass 405. Likewise, the sensor plate 450 is stiff relative to the cover glass 405 and display stack 415, and so does not deflect to the extent those elements do under an exerted force.

Thus, in operation, a force may be exerted on the cover glass 405, thereby causing it to deflect downward. The force generally causes greater deflection at the point of impact and in the region immediately nearby; the cover glass has some compliance that permits it to bend under such force. This likewise bends or otherwise deflect the display stack 415 and affixed to the first capacitive sensing element 420. Thus, a force exerted on the cover glass 405 may locally move at least a portion of the first capacitive sensing element 420 nearer to a corresponding portion of the second capacitive sensing element 440. This change in distance between the two capacitive sensing elements 420, 440 may cause a change in capacitance on the sensing element. The change in capacitance, in turn, may be correlated to the exerted force.

A second gap 455 separates the sensor plate 450 from the structural midplate 460. In this configuration, the second gap 455 is generally sized to permit motion (such as deflection) of the sensor plate 450 to occur without the sensor plate and midplate contacting one another.

The midplate 460 may be connected to the spacer 410 or to the housing 400 in order to impart structure and strength to the electronic device. In some embodiments, a support 465 may be positioned at least partially beneath the midplate 460. The support 465 may extend from the housing and may be affixed to the midplate 460 or positioned near the midplate. It should be appreciated that the support 465 is entirely optional.

Electronic circuitry 470, such as may be used to operate the device and/or supply power thereto, may be positioned beneath the midplate 460 and within the housing 400. The electronic circuitry 470 may include a variety of different element such as, but not limited to, a battery, a processing unit, one or more sensors, interconnections, a memory, and so on.

While various alternative devices for force sensing through capacitance changes have been described, those skilled in the art, after reading this application, will recognize that there are many alternatives which are also within the scope and spirit of the disclosure and the invention. In alternative embodiments, an amount of surface flex can provide for a change in distance (and thus capacitance) between drive and sensor circuits, with the effect that surface flex can be detected and located.

In alternative embodiments, a laminated piezo-active film (such as a piezo electric film or a piezo resistive film) provides a charge (or a set of localized charges) in response to surface flex, which provides a capacitive measurement circuit with the ability to determine an amount and location of that surface flex. For example, the amount and location of that surface flex can be distributed across the body of the device, which can have the effect that a capacitive measurement circuit can determine one or points of localized maximum surface flex, including a measurement of strength of those localized maxima.

Force Sensing Elements

Figure 5:
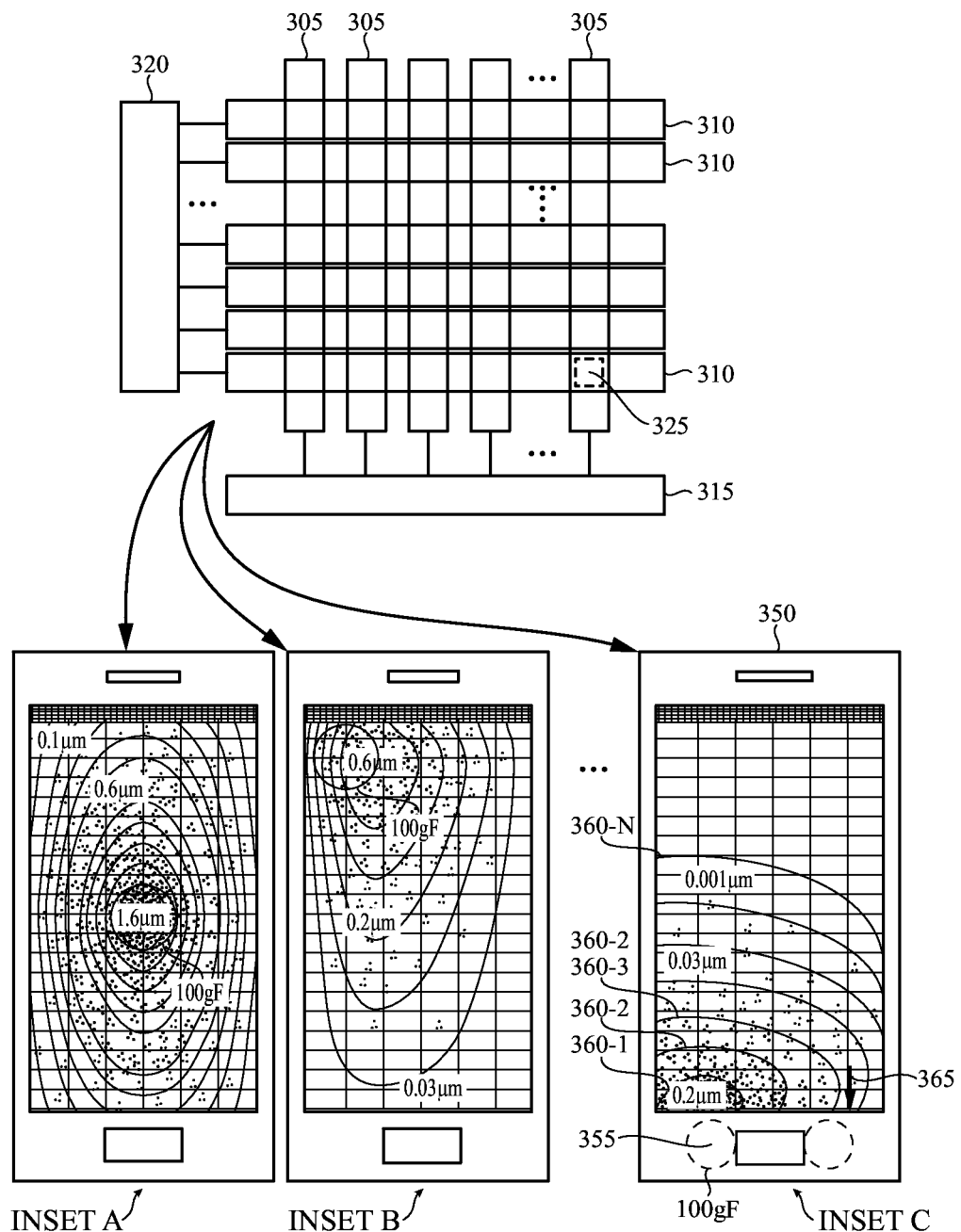
FIG. 5 shows a first conceptual drawing of a set of force sensing elements.

FIG. 5 shows a first conceptual drawing of a set of force sensing elements, which may be used as (or in place of) capacitive sensing elements 140a, 140b.

ROWS AND COLUMNS. In one embodiment, a force-sensitive device and system can include a set of drive columns 305 of electrodes and a set of sense rows 310 of electrodes. In alternative embodiments, the columns may be sensed and the rows may be driven. The drive columns 305 are coupled to one or more drive signals, such as from a drive circuit 315. For example, the drive circuit 315 can include a timed circuit that selects each drive column 305 in turn and drives that column for a relatively short period of time, eventually selecting each such drive column 305 in a round-robin fashion. Similarly, the sense rows 310 are coupled to one or more sense receivers, such as a sense circuit 320. For example, the sense circuit 320 can also include a timed circuit that selects each sense row 310 in turn and senses that row for a relatively short period of time, eventually selecting each such sense row 310 in a round-robin fashion.

This can have the effect that each intersection 325 of a row and a column (one example of a "force sensing element" 325) is selected in turn for a relatively short period of time, relatively rapidly. For example, when each force sensing element 325 is selected sufficiently rapidly that a user cannot discern the time when they are selected, it can appear to that user that all force sensing elements 325 are sensed essentially simultaneously.

It should be appreciated that alternative embodiments may drive multiple force sensing elements simultaneously as opposed to sequentially. Further, different force sensing elements 325 may be driven at different frequencies and/or phases, or both, in order to permit multiple elements to be driven at the same time and minimize cross-talk or other interference between sensing elements.

Figure 11A:
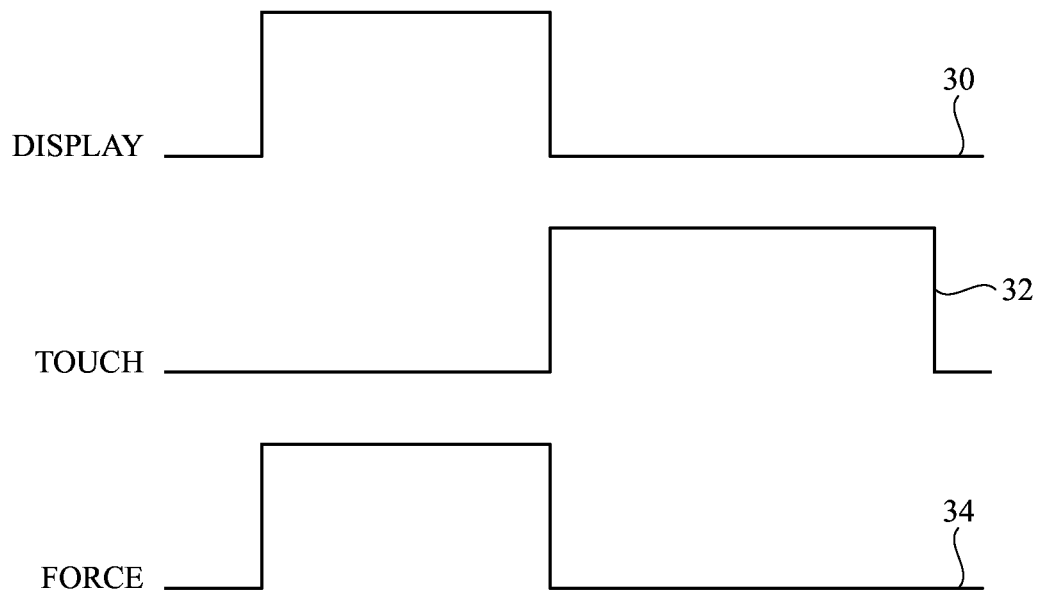
FIG. 11A is a first example of a timing diagram for the computing device.
Figure 11B:
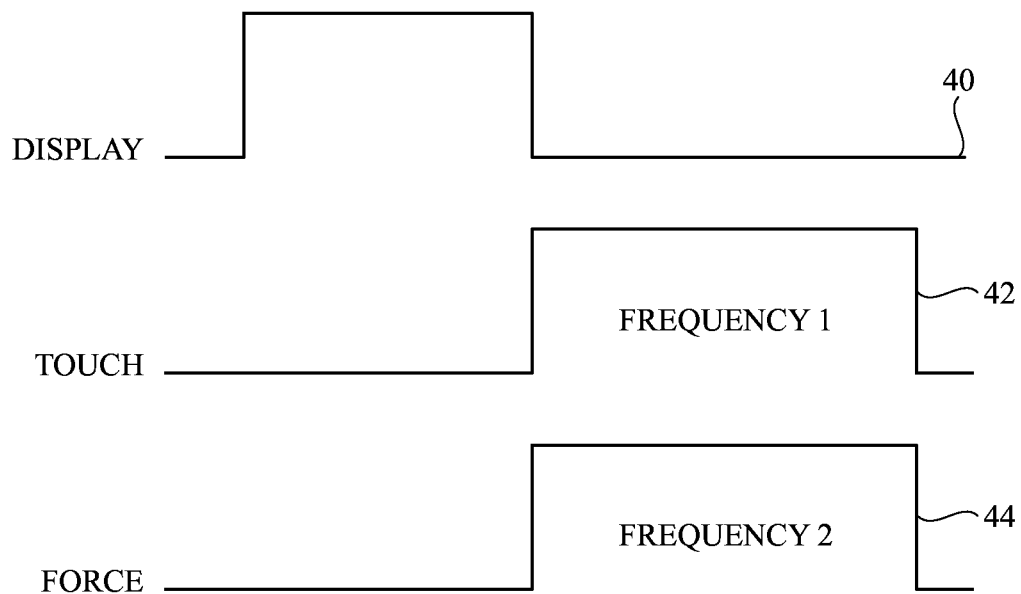
FIG. 11B is a second example of a timing diagram for the computing device.
Figure 11C:
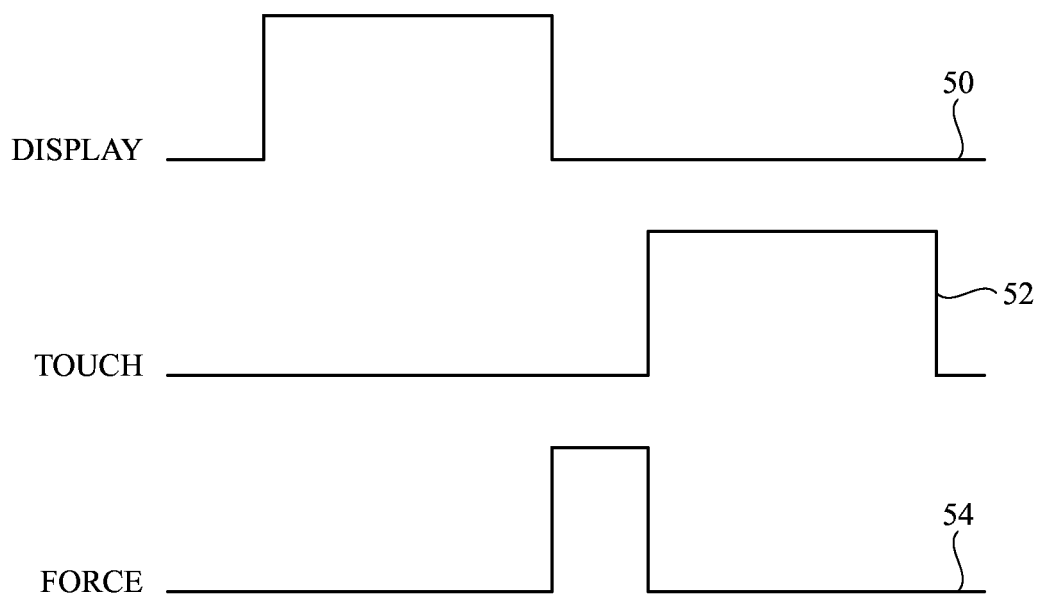
FIG. 11C is a third example of a timing diagram.

FIGS. 11A-11C generally describe a variety of timing schemes for use by various embodiments when incorporated into an electronic device with other driven elements, such as a display and/or another sensing element (one example of which is a touch sensor), and will be described in more detail below.

In one embodiment, the force-sensitive device and system determines an amount of force applied to that individual force sensing element 325. This can have the effect of producing a map of applied force at each individual force sensing element 325, sometimes herein called a "heat map". For example, as shown in the inset figures A-C, the heat map of applied force can show both the amount of applied force, but also the location at which that force is applied.

For example, an amount of applied force Fa at an applied location [Xa, Ya] can provide a substantial amount of sensed force Fs, even a substantial distance away from the applied location [Xa, Ya], such as at a sensed location [Xs, Ys]. This can be due to substantial surface flex being detected at the sensed location [Xs, Ys]. In one embodiment, a force-sensitive device can determine the applied force Fa at the applied location [Xa, Ya] in response to the heat map of sensed forces Fs at sensed locations [Xs, Ys]. For example, the force-sensitive device can determine a set of local maxima of sensed forces Fs at sensed locations [Xs, Ys], and conclude that the local maximum of sensed forces Fs is also the location and amount of applied force Fa.

In alternative embodiments, one or more touch sensors can also assist in determining a location at which force is applied, in response to determining a location of touch. The touch sensors may detect a user touch on an input surface of an electronic device, for example. Concurrently or additionally, one or more force sensors may determine that a force has been applied to the input surface. Insofar as an overall force is known and a location of a touch (or touches, in the case of multitouch-capable touch sensors), a force may be assigned to a particular location on an input surface corresponding to a touch. In the event that a single touch is detected, the force may be assigned completely to the location of the touch. If multiple touch locations are detected, then the force may be weighted and assigned to the various touch locations through a variety of manners. As one example, the sensed force may be greater in one portion of the input surface than in another. If a touch is near this portion, a majority of a force may be assigned to that particular touch location. A centroid of the applied and sensed forces may also be determined if a number of touch locations is known, insofar as an embodiment may presume that at least some amount of force is exerted at each touched location. The centroid may be used to assign force to the various touch locations, for example based on the touch locations' distances from the centroid. Yet other manners of associating force with one or more touch locations, as measured by one or more touch sensors, may be employed by alternative embodiments.

CALIBRATION TO ZERO. In one embodiment, the force-sensitive device can determine an amount of detected surface flex at a time before delivery of the device to the user. For example, the amount of detected surface flex can be measured at each force sensing element 325, as determined when the device is manufactured. It may occur that when there is no force being applied to the device, there is still some measured surface flex at one or more force sensing elements 325. For a first example, it may occur that the device is slightly warped, with the effect that surface flex of that warping would be measured. For a second example, it may occur that one or more sensors in the device is not identically calibrated, with the effect that surface flex would be measured by that sensor even if there were no actual surface flex.

In one embodiment, the force-sensitive device can measure surface flex when it is known there is no applied force, and can generate an offset for each force sensing element 325 so that the measurement for each force sensing element 325 is zero when it is known there is no applied force. Similarly, in one embodiment, the force-sensitive device can measure surface flex when a designated applied force is known to be present, such as when a known weight is placed at a known location on the surface of the device.

In one embodiment, the force-sensitive device can be responsive to surface flex even when there are no force sensing elements 325 immediately below the location where force is being applied. For example, as shown in inset figure A and inset figure B, when the user applies a force to a particular location, the surface flex is responsive below that location and in other locations as well.

In one embodiment, the force-sensitive device can be responsive to surface flex even when the force is applied outside the range of where the entire set of force sensing elements 325 is located. For example, as shown in inset figure C, when the user applies a force to a particular location outside the range of where the entire set of force sensing elements 325 is located, the surface flex is responsive below locations where the force sensing elements 325 are in fact located.

SOFT BUTTON. In an example device 350, as shown in the inset figure C, the user may apply force to a soft button 355. The soft button 355 may be marked in one of several ways: (A) The soft button 355 may be marked on the device 350 using ink, or otherwise indicated on the face of the device 350; (B) The soft button 355 may be marked using the display using an arrow 365 or other indicator; and/or (C) The user may simply choose a location that is available for the soft button 355, at the user's discretion. For example, when the user applies force to the soft button 355, the device 350 can detect and measure surface flex in the range where the force sensing elements 325 are located, detecting and measuring isobars 360-1 through 360-N of surface flex. In such cases, when the user applies force to the soft button 355, the device 350 can, in response to that applied force, detect and measure those isobars 360-1 through 360-N, and determine, in response thereto, where the soft button 355 is being pressed by the user. In such cases, there may be one or more such soft buttons 355.

In some embodiments, force sensing as described generally herein may be used in virtually any segment or portion of a device. For example, consider an electronic device with a touch-sensitive display, as may be embodiment in a variety of smart phones, tablet computing devices, computer monitors, touchscreens, and the like. Many such devices have a boundary about the display. Likewise, many such devices have non-display regions that may be adjacent to or near a display. As one specific example, many smart phones and tablet computing devices include a border about a display; this border may have a base area beneath the display, an upper area above the display, and/or side areas. In many such devices, only the display itself is touch-sensitive; the border is not. The border may be force-sensitive, however. In certain embodiments, the structures and methods described herein may be implemented in such a border region. Presuming the device's display is touch-sensitive, the device may determine that any sensed force is exerted in the border if the device does not sense any touch on the display.

External Manipulation

Figure 6:
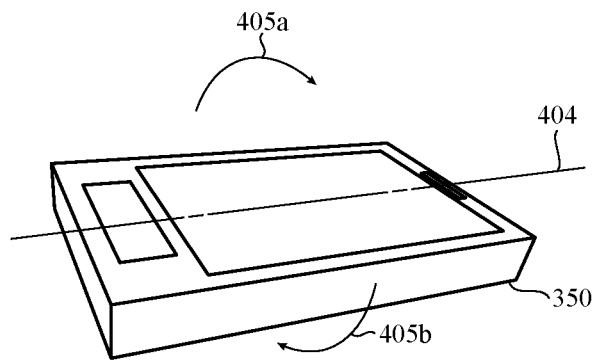
FIG. 6 shows a conceptual drawing of a device for force sensing being manipulated.
Figure 6:
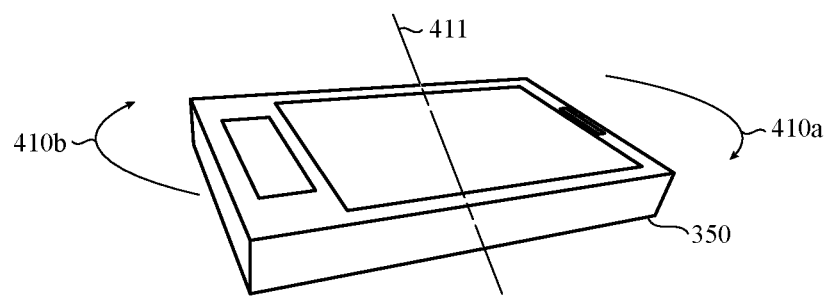
Figure 6:
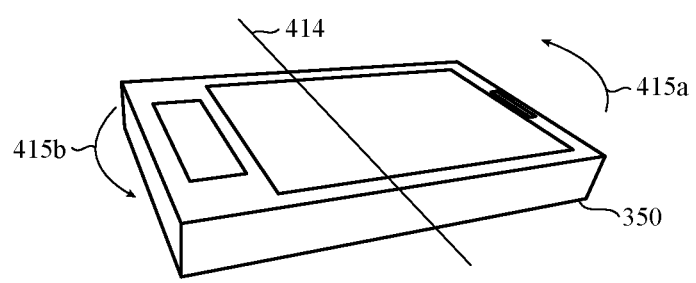

FIG. 6 shows a conceptual drawing of a device for force sensing being manipulated.

In one embodiment, the force-sensitive device can be sufficiently responsive to surface flex that it can determine and measure surface flex in response to strain on the device, or a frame of the device, or even in response to orientation of the device. As described herein, the force sensor can be responsive to inertial forces applied to the device, other than pressure on a display surface of the device. In one embodiment, such inertial forces can include one or more of the following: (A) Inertial forces can include gravity, such as due to the physical orientation of a force sensor with respect to the Earth's gravitational field, which can change when the force sensor, or device including the force sensor, is turned over or otherwise has its orientation changed; and/or (B) Inertial forces can include acceleration, such as due to the force sensor or device being moved, such as held in a hand while walking, swinging one's arms, being jostled, or being accelerated in a moving vehicle. In one embodiment, as described herein, gravity can reduce the capacitive gap when the unit is turned upside-down, such as by drawing portions of the first and second capacitance sensing elements together in that configuration.

In such cases, specific details of what may occur to the gap between the capacitive plates of the capacitive sensing element 140a and 140b may also depend on the relative stiffness and the relative densities of the materials of those capacitive plates. Accordingly, while inertial forces on the device can affect the force sensor, the relative amount of the effect due to those inertial forces may vary depending on those factors or other factors. In one embodiment, the response of the force sensor to inertial forces may be tuned by adjustment of mechanical properties of those capacitive plates. For example, the force sensor may be tuned to provide little or no relative change in the capacitive gap in response to inertial forces.

For a first example, the device 350 may be turned upside down, such as about an axis 404, such as with the device display pointing downward or away from the user, rather than upward and presenting toward the user, such as if the user were to apply forces 405a and 405b. In such cases, action of gravity would tend to draw the compressible gap 135 in a different direction than when the device 350 is right side up. In particular, when the device 350 is right side up, gravity pulls the first and second capacitance sensing elements 140a and 140b apart, while when the device 350 is upside down, gravity draws the capacitive sensing elements 140a, 140b together. In such cases, the device 350 can determine its orientation in response to one or more inertial sensors, such as accelerometers or gyroscopic devices incorporated within the device 350, and can adjust the measurement of capacitance by the capacitance sensing element 140a and 140b accordingly.

For a second example, the device 350 may be bent, such as about an axis 411, such as if the user were to apply forces 410a and 410b. In such cases, the device 350 can determine and measure, in response to surface flex, an amount of bending force about the axis 411. In response to the amount of bending force about the axis 411, the device 350 may adjust the amount of surface flex from which it determines an amount and location of applied force. Moreover, in response to the amount of bending force, the device 350 may provide one or more signals to a GUI or application program, in response to which that GUI or application program may perform (or alter) one or more functions associated with that bending force.

For a third example, the device 350 may be twisted, such as with respect to an axis 414, such as if the user were to apply forces 415a and 415b. In such cases, the device 350 may determine and measure, in response to surface flex, an amount of twisting force about the axis 414. In response to the amount of twisting force about the axis 414, the device 350 may adjust the amount of surface flex from which the device determines an amount and location of applied force. Moreover, in response to the amount of twisting force, the device 350 may provide one or more signals to a GUI or application program, in response to which that GUI or application program may perform (or alter) one or more functions associated with that twisting force.

For a fourth example, the device may be deformed (not shown), such as due to having been dropped, struck, or otherwise damaged. In such cases, forces from a device frame, such as a device frame which has been distorted and now exerts internal forces on circuits and other elements within the device, might have the effect of showing one or more capacitance changes. For example, a damaged corner of the device might have the effect of providing a strain or stress on the device, which might appear as one or more capacitance changes. In such cases, the device may determine a relatively sudden and persistent change in capacitance changes, in response to which the device may conclude that its frame has been distorted and that the distortion should be compensated for by determining a new constant or factor that may be applied to any sensed or correlated force, in order to offset the effects of such distortion. Likewise, any other element of an electronic device other than a frame may suffer distortion that may impact force sensing. Such distortion may be subject to detection and/or compensation in a similar manner. Further, to the extent that a capacitance change due to any such distortion is localized in a particular region of the device and/or force sensor, the compensation may be applied only to force sensing in that region.

Figure 7:
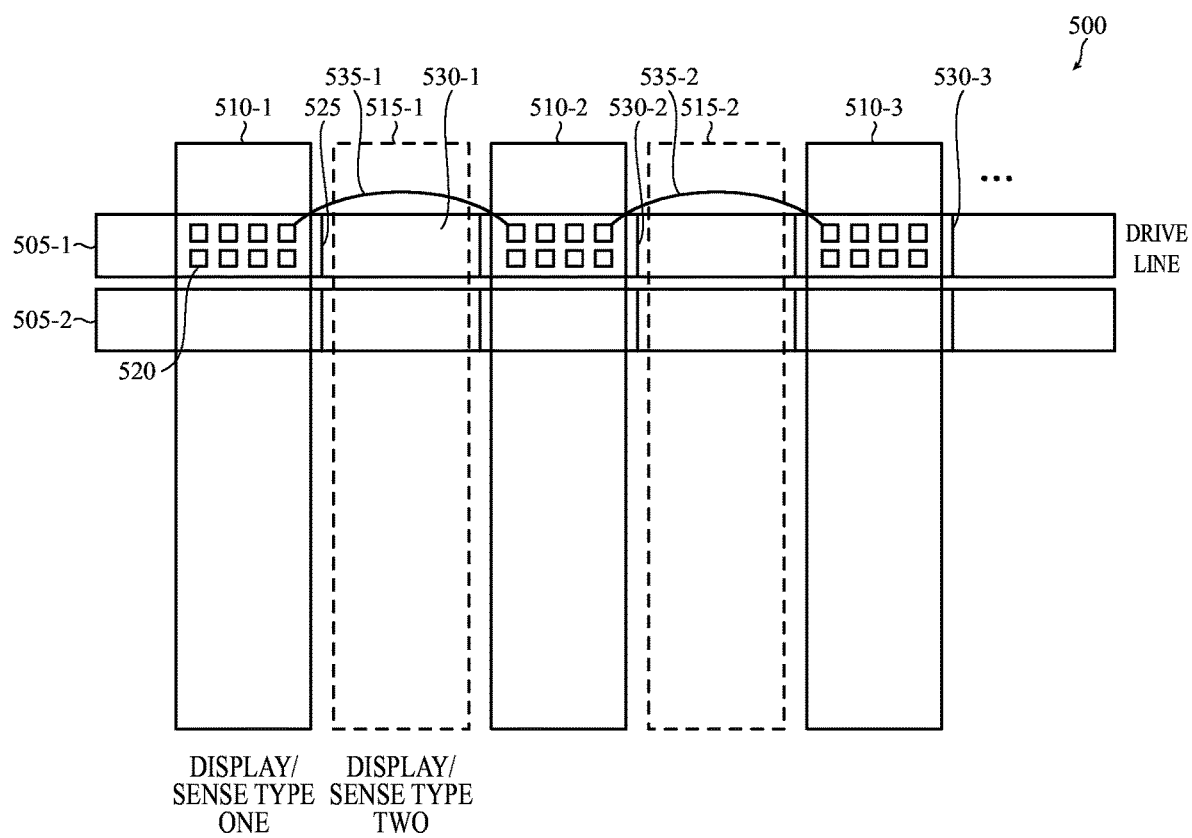
FIG. 7 shows a second conceptual drawing of a set of force sensing elements.

FIG. 7 shows a second conceptual drawing of a set of force sensing elements.

In one embodiment, a force-sensitive device can include a display and sense circuit (such as described below), including an array 500 of display and sense elements. The array 500 can include one or more drive lines 505-N, one or more sense lines 510-N for a first sense feature, one or more sense lines 515-N for a second sense feature, a set of first sense elements 520 each at an intersection of a drive line and first sense line, a set of second sense elements 525 each at an intersection of a drive line and second sense line, one or more ground elements 530-N, and one or more tunnel elements 535-N.

In one embodiment, the drive lines 505-N and the one or more sense lines 510-N for a first sense feature combine to provide first sense elements 520 each at an intersection of a drive line and first sense line, as described with respect to FIG. 5. Similarly, the drive lines 505-N and the one or more sense lines 515-N for a second sense feature combine to provide second sense elements 525 each at an intersection of a drive line and second sense line, as described with respect to FIG. 5. As described herein, the first sense feature and the second sense feature can include two of several features: (A) a touch feature, including touch sense elements; (B) a force sense feature, including force sense elements. For example, the array 500 can include a touch sense circuit and a force sense circuit.

In one embodiment, one or more ground elements 530-N can separate each pair of sense lines 510-N for a first sense feature and sense lines 515-N for a second sense feature. This can have the effect that the drive lines 505-N are directed to driving either the sense lines 510-N for the first sense feature, or the sense lines 515-N for the second sense feature, but not both simultaneously. The drive lines 505-N can alternate between the sense lines 510-N for the first sense feature, and the sense lines 515-N for the second sense feature.

In one embodiment, the drive lines 505-N are connected across the sense lines 510-N and 515-N by tunnel elements 535-N. This can have the effect that the drive lines 505-N are fully connected across all sense lines 510-N while they are driving the first sense elements 525, and all sense lines 515-N while they are driving the second sense elements 530, without the involvement of overlap between those drive lines 505-N and both sets of those sense lines 510-N and 515-N.

In one embodiment, the display elements can be substantially smaller than the touch sense elements or the force sense elements. This can have the effect that the display can be presented at a finer level of detail than the touch sensing circuits or the force sensing circuits might be able to operate. In such cases, the display elements can be operated in a time-multiplexed fashion, or in another type of multiplexed fashion.

Method of Operation

Figure 8:
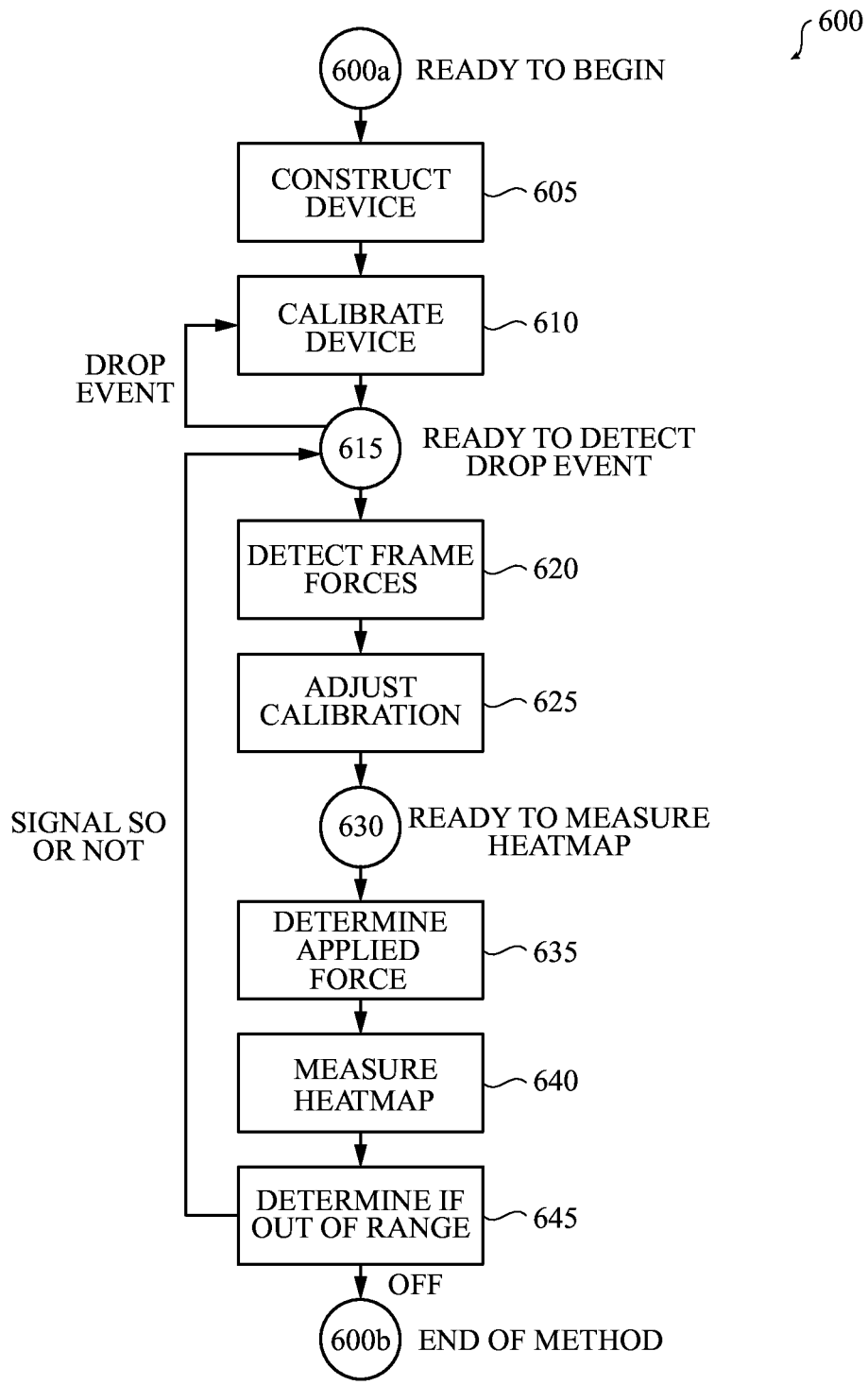
FIG. 8 shows a conceptual diagram of a method of operation.

FIG. 8 shows a conceptual diagram of a method of operation. The method 600 includes a set of flow points and method steps. Although these flow points and method steps are shown performed in a particular order, in the context of the invention, there is no particular requirement for any such limitation. For example, the flow points and method steps may be performed in a different order, concurrently, in parallel, or otherwise. Similarly, although these flow points and method steps are shown performed by a general purpose processing unit in a force-sensitive device, in the context of the invention, there is no particular requirement for any such limitation. For example, one or more such method steps may be performed by special purpose processing unit, by another circuit, or be offloaded to other processing units or other circuits in other devices, such as by offloading those functions to nearby devices using wireless technology or by offloading those functions to cloud computing functions.

At a flow point 600a, the method 600 is ready to begin.

At a step 605, the force-sensitive device can be constructed, including its compressible gap and its capacitive sensor.

At a step 610, the force-sensitive device can be calibrated with respect to a known set of forces applied to at least one surface of the force-sensitive device. For a first example, the force-sensitive device can be calibrated with respect to zero forces applied to a top surface of the force-sensitive device. For a second example, the force-sensitive device can be calibrated with respect to a known set of forces applied to a top surface of the force-sensitive device.

At a flow point 615, the force-sensitive device attempts to detect a "drop event", such as any event having the property of changing the detection and measure of capacitance on the compressible gap. If a drop event is detected, the method 600 proceeds with the earlier step 610. If no drop event is detected, the method 600 proceeds with the next step 620.

At a step 620, the force-sensitive device uses a touch sensor to attempt to detect whether a user's finger (or other body part) is touching a display surface of the device. If not, the method 600 proceeds with the next step 625. If so, the method 600 proceeds with the step 630.

At a step 625, the force-sensitive device, having determined that no user's finger is touching a display surface of the device, that is, that no applied force should be measured at time of this step, the force-sensitive device resets its baseline "zero force" measurement of capacitance to the current lack of applied force due to no user's finger presently touching a display surface of the device. In alternative embodiments, the force-sensitive device can decide that when no user's finger is touching a display surface of the device, the force-sensitive device should be disabled, and the method 600 may proceed to the flow point 600b.

At a step 630, the force-sensitive device attempts to detect forces on its frame, such as bend or twist, or such as acceleration (including centripetal forces). For example, if the force-sensitive device is tilted or upside down, unusual acceleration due to gravity should be detected. If the force-sensitive device detects any such forces, the method 600 proceeds with the next step 635. If the force-sensitive device does not detect any such forces, the method 600 proceeds with the next flow point 640.

At a step 635, the force-sensitive device adjusts its calibration to account for forces on its frame.

At a flow point 640, the force-sensitive device is ready to measure a heat map of capacitance.

In related embodiments, the force-sensitive device measures a heat map of capacitance, including a measurement of surface flux at substantially each of a set of force sensing elements.

In related embodiments, the force-sensitive device determines an amount and location of an applied force on its surface.

In related embodiments, the force-sensitive device determines if the amount and location of the applied force is out of the range of its force sensing elements. If so, the force-sensitive device sends a signal to a GUI or application program to that effect. If not, the force-sensitive device proceeds with the flow point 615.

At a flow point 600b, the method 600 is over. In one embodiment, the method 600 is repeated so long as the force-sensitive device is powered on.

Touch-Sensitive Device System

FIG. 9 shows a conceptual drawing of communication between a touch I/O device and a computing system.

FIG. 10 shows a conceptual drawing of a system including a force-sensitive touch-sensitive device.

Described embodiments may include touch I/O device 901 that can receive touch input and force input (such as possibly including touch locations and applied force at those locations) for interacting with computing system 903 (such as shown in FIG. 9) via wired or wireless communication channel 902. Touch I/O device 901 may be used to provide user input to computing system 903 in lieu of or in combination with other input devices such as a keyboard, mouse, or possibly other devices. In alternative embodiments, touch I/O device 901 may be used in conjunction with other input devices, such as in addition to or in lieu of a mouse, trackpad, or possibly another pointing device. One or more touch I/O devices 901 may be used for providing user input to computing system 903. Touch I/O device 901 may be an integral part of computing system 903 (e.g., touch screen on a laptop) or may be separate from computing system 903.

Touch I/O device 901 may include a touch sensitive and/or force-sensitive panel which is wholly or partially transparent, semitransparent, non-transparent, opaque or any combination thereof. Touch I/O device 901 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard, disposed on a trackpad or other pointing device), any multi-dimensional object having a touch sensitive surface for receiving touch input, or another type of input device or input/output device.

In one example, touch I/O device 901 embodied as a touch screen may include a transparent and/or semitransparent touch sensitive and force-sensitive panel at least partially or wholly positioned over at least a portion of a display. (Although the touch sensitive and force-sensitive panel is described as at least partially or wholly positioned over at least a portion of a display, in alternative embodiments, at least a portion of circuitry or other elements used in embodiments of the touch sensitive and force-sensitive panel may be at least positioned partially or wholly positioned under at least a portion of a display, interleaved with circuits used with at least a portion of a display, or otherwise.) According to this embodiment, touch I/O device 901 functions to display graphical data transmitted from computing system 903 (and/or another source) and also functions to receive user input. In other embodiments, touch I/O device 901 may be embodied as an integrated touch screen where touch sensitive and force-sensitive components/devices are integral with display components/devices. In still other embodiments a touch screen may be used as a supplemental or additional display screen for displaying supplemental or the same graphical data as a primary display and to receive touch input, including possibly touch locations and applied force at those locations.

Touch I/O device 901 may be configured to detect the location of one or more touches or near touches on device 901, and where applicable, force of those touches, based on capacitive, resistive, optical, acoustic, inductive, mechanical, chemical, or electromagnetic measurements, in lieu of or in combination or conjunction with any phenomena that can be measured with respect to the occurrences of the one or more touches or near touches, and where applicable, force of those touches, in proximity to device 901. Software, hardware, firmware or any combination thereof may be used to process the measurements of the detected touches, and where applicable, force of those touches, to identify and track one or more gestures. A gesture may correspond to stationary or non-stationary, single or multiple, touches or near touches, and where applicable, force of those touches, on touch I/O device 901. A gesture may be performed by moving one or more fingers or other objects in a particular manner on touch I/O device 901 such as tapping, pressing, rocking, scrubbing, twisting, changing orientation, pressing with varying pressure and the like at essentially the same time, contiguously, consecutively, or otherwise. A gesture may be characterized by, but is not limited to a pinching, sliding, swiping, rotating, flexing, dragging, tapping, pushing and/or releasing, or other motion between or with any other finger or fingers, or any other portion of the body or other object. A single gesture may be performed with one or more hands, or any other portion of the body or other object by one or more users, or any combination thereof.

Computing system 903 may drive a display with graphical data to display a graphical user interface (GUI). The GUI may be configured to receive touch input, and where applicable, force of that touch input, via touch I/O device 901. Embodied as a touch screen, touch I/O device 901 may display the GUI. Alternatively, the GUI may be displayed on a display separate from touch I/O device 901. The GUI may include graphical elements displayed at particular locations within the interface. Graphical elements may include but are not limited to a variety of displayed virtual input devices including virtual scroll wheels, a virtual keyboard, virtual knobs or dials, virtual buttons, virtual levers, any virtual UI, and the like. A user may perform gestures at one or more particular locations on touch I/O device 901 which may be associated with the graphical elements of the GUI. In other embodiments, the user may perform gestures at one or more locations that are independent of the locations of graphical elements of the GUI. Gestures performed on touch I/O device 901 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 903 (e.g., affect a state or mode of a GUI, application, or operating system). Gestures may or may not be performed on touch I/O device 901 in conjunction with a displayed cursor. For instance, in the case in which gestures are performed on a touchpad, a cursor (or pointer) may be displayed on a display screen or touch screen and the cursor may be controlled via touch input, and where applicable, force of that touch input, on the touchpad to interact with graphical objects on the display screen. In other embodiments in which gestures are performed directly on a touch screen, a user may interact directly with objects on the touch screen, with or without a cursor or pointer being displayed on the touch screen.

Feedback may be provided to the user via communication channel 902 in response to or based on the touch or near touches, and where applicable, force of those touches, on touch I/O device 901. Feedback may be transmitted optically, mechanically, electrically, olfactory, acoustically, haptically, or the like or any combination thereof and in a variable or non-variable manner.

Attention is now directed towards embodiments of a system architecture that may be embodied within any portable or non-portable device including but not limited to a communication device (e.g. mobile phone, smart phone), a multi-media device (e.g., MP3 player, TV, radio), a portable or handheld computer (e.g., tablet, netbook, laptop), a desktop computer, an All-In-One desktop, a peripheral device, or any other (portable or non-portable) system or device adaptable to the inclusion of system architecture 900, including combinations of two or more of these types of devices.

FIG. 10 shows a block diagram of one embodiment of system 1000 that generally includes one or more computer-readable mediums 1001, processing system 1004, Input/Output (I/O) subsystem 1006, electromagnetic frequency circuitry, such as possibly radio frequency (RF) or other frequency circuitry 1008 and audio circuitry 1010. These components may be coupled by one or more communication buses or signal lines 1003. Each such bus or signal line may be denoted in the form 1003-X, where X can be a unique number. The bus or signal line may carry data of the appropriate type between components; each bus or signal line may differ from other buses/lines, but may perform generally similar operations.

It should be apparent that the architectures shown in FIG. 9 and FIG. 10 are only example architectures of system 1000, and that system 1000 may have more or fewer components than shown, or a different configuration of components. The various components shown in FIGS. 9-10 can be implemented in hardware, software, firmware or any combination thereof, including one or more signal processing and/or application specific integrated circuits.

RF circuitry 1008 is used to send and receive information over a wireless link or network to one or more other devices and includes well-known circuitry for performing this function. RF circuitry 1008 and audio circuitry 1010 are coupled to processing system 1004 via peripherals interface 1016. Interface 1016 includes various known components for establishing and maintaining communication between peripherals and processing system 1004. Audio circuitry 1010 is coupled to audio speaker 1050 and microphone 1052 and includes known circuitry for processing voice signals received from interface 1016 to enable a user to communicate in real-time with other users. In some embodiments, audio circuitry 1010 includes a headphone jack (not shown).

Peripherals interface 1016 couples the input and output peripherals of the system to processor 1018 and computer-readable medium 1001. Processor 1018 is one example of a processing unit; in general, a processing unit may be one or more processors, special purpose processors, microprocessors, distributed processing systems, networked processors, and the like. One or more processors 1018 communicate with one or more computer-readable mediums 1001 via controller 1020. Computer-readable medium 1001 can be any device or medium that can store code and/or data for use by one or more processors 1018. Medium 1001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 1001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 1018 run various software components stored in medium 1001 to perform various functions for system 1000. In some embodiments, the software components include operating system 1022, communication module (or set of instructions) 1024, touch and applied force processing module (or set of instructions) 1026, graphics module (or set of instructions) 1028, one or more applications (or set of instructions) 1030, and force sensing module (or set of instructions) 1038. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, medium 1001 may store a subset of the modules and data structures identified above. Furthermore, medium 1001 may store additional modules and data structures not described above.

Operating system 1022 includes various procedures, sets of instructions, software components and/or drivers for controlling and managing general system tasks (e.g., memory management, storage device control, power management, etc.) and facilitates communication between various hardware and software components.

Communication module 1024 facilitates communication with other devices over one or more external ports 1036 or via RF circuitry 1008 and includes various software components for handling data received from RF circuitry 1008 and/or external port 1036.

Graphics module 1028 includes various known software components for rendering, animating and displaying graphical objects on a display surface. In embodiments in which touch I/O device 1012 is a touch sensitive and force-sensitive display (e.g., touch screen), graphics module 1028 includes components for rendering, displaying, and animating objects on the touch sensitive and force-sensitive display.

One or more applications 1030 can include any applications installed on system 1000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system, also sometimes referred to herein as "GPS"), a music player, and otherwise.

Touch and applied force processing module 1026 includes various software components for performing various tasks associated with touch I/O device 1012 including but not limited to receiving and processing touch input and applied force input received from I/O device 1012 via touch I/O device controller 1032.

System 1000 may further include force sensing module 1038 for performing force sensing.

I/O subsystem 1006 is coupled to touch I/O device 1012 and one or more other I/O devices 1014 for controlling or performing various functions. Touch I/O device 1012 communicates with processing system 1004 via touch I/O device controller 1032, which includes various components for processing user touch input and applied force input (e.g., scanning hardware). One or more other input controllers 1034 receives/sends electrical signals from/to other I/O devices 1014. Other I/O devices 1014 may include physical buttons, dials, slider switches, sticks, keyboards, touch pads, additional display screens, or any combination thereof.

If embodied as a touch screen, touch I/O device 1012 displays visual output to the user in a GUI. The visual output may include text, graphics, video, and any combination thereof. Some or all of the visual output may correspond to user-interface objects. Touch I/O device 1012 forms a touch-sensitive and force-sensitive surface that accepts touch input and applied force input from the user. Touch I/O device 1012 and touch screen controller 1032 (along with any associated modules and/or sets of instructions in medium 1001) detects and tracks touches or near touches, and where applicable, force of those touches (and any movement or release of the touch, and any change in the force of the touch) on touch I/O device 1012 and converts the detected touch input and applied force input into interaction with graphical objects, such as one or more user-interface objects. In the case in which device 1012 is embodied as a touch screen, the user can directly interact with graphical objects that are displayed on the touch screen. Alternatively, in the case in which device 1012 is embodied as a touch-sensitive device other than a touch screen (e.g., a touch pad or trackpad), the user may indirectly interact with graphical objects that are displayed on a separate display screen embodied as I/O device 1014.

Embodiments in which touch I/O device 1012 is a touch screen, the touch screen may use LCD (liquid crystal display) technology, LPD (light emitting polymer display) technology, OLED (organic LED), or OEL (organic electro luminescence), although other display technologies may be used in other embodiments.

Feedback may be provided by touch I/O device 1012 based on the user's touch, and applied force, input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 1000 also includes power system 1044 for powering the various hardware components and may include a power management system, one or more power sources, a recharging system, a power failure detection circuit, a power converter or inverter, a power status indicator and any other components typically associated with the generation, management and distribution of power in portable devices.

In some embodiments, peripherals interface 1016, one or more processors 1018, and memory controller 1020 may be implemented on a single chip, such as processing system 1004. In some other embodiments, they may be implemented on separate chips.

In one embodiment, an example system includes a force sensor coupled to the touch I/O device 1012, such as coupled to a force sensor controller. For example, the force sensor controller can be included in the I/O subsystem 1006. The force sensor controller can be coupled to a processing unit or other computing device, such as the processor 1018 or another processing unit, with the effect that information from the force sensor controller can be measured, calculated, computed, or otherwise manipulated. In one embodiment, the force sensor can make use of one or more processors or other computing devices, coupled to or accessible to the touch I/O device 1012, such as the processor 1018, the secure processor 1040, or otherwise. In alternative embodiments, the force sensor can make use of one or more analog circuits or other specialized circuits, coupled to or accessible to the touch I/O device 1012, such as might be coupled to the I/O subsystem 1006. It should be appreciated that many of the components described herein may be optional and omitted in some embodiments, such as the secure processor 1040, or combined, such as the processor and secure processor. The same is generally true for all figures described herein.

Timing Diagram

In some embodiments various components of the computing device and/or touch screen device may be driven or activated separately from each other and/or on separate frequencies. Separate drive times and/or frequencies for certain components, such as the display, touch sensor or sensors (if any), and/or force sensors may help to reduce cross-talk and noise in various components. FIGS. 11A-11C illustrate different timing diagram examples, each will be discussed in turn below. It should be noted that the timing diagrams discussed herein are meant as illustrative only and many other timing diagrams and driving schemes are envisioned.

With respect to FIG. 11A, in some embodiments, the display 14 and the force-sensitive device 18 may be driven substantially simultaneously, with the touch sensitive component 1001 being driven separately. In other words, the driver circuits for the force-sensitive device 18 may be activated during a time period that the display is also activated. For example, the display signal 30 and the force sensing signal 34 may both be on during a first time period and then may both inactive as the touch sensing device signal 32 is activated.

With respect to FIG. 11B, in some embodiments, the touch and force devices may be driven at substantially the same time and the display may be driven separately. For example, the display signal 40 may be set high (e.g., active) during a time that the touch signal 42 and the force signal 44 may both be low (e.g., inactive), and the display signal 40 may be low while both the touch signal 42 and the force signal 44 are high. In this example, the touch signal 42 and the force signal 44 may have different frequencies. In particular, the touch signal 42 may have a first frequency F1 and the force signal 44 may have a second frequency F2. By utilizing separate frequencies F1 and F2, the computing device may be able to sample both touch inputs and force inputs at substantially the same time without one interfering with the other, which in turn may allow the processor to better correlate the touch inputs and the force inputs. In other words, the processor may be able to correlate a force input to a touch input because the sensors may be sampling at substantially the same time as one another. Additionally, the separate frequencies may reduce noise and cross-talk between the two sensors. Although the example in FIG. 11B is discussed with respect to the force and touch signals, in other embodiments each of the drive signal, the touch signal, and/or the force signal may have separate frequencies from each other and may be activated simultaneously or correspondingly with another signal.

With respect to FIG. 11C, in some embodiments, various components in the computing device may be driven separately from one another. For example, the display signal 50 may be driven high, while both the touch signal 52 and the force signal 54 are low. Additionally, the touch signal 52 may be high while both the force signal 54 and the display signal 50 are low and similarly the force signal 54 may be high while both the display signal 50 and the touch signal 52 are low. In these examples, the force signal's active period may be positioned between the active periods of the display and the touch sensor. In other words, the force sensor 18 may be driven between the display being driven and the touch sensors being driven. In these examples, each of the devices may be active at separate times from one another, thereby reducing inter-system noise. In some embodiments, the force sensor may have a shorter drive time than the display or touch signals; however, in other embodiments, the force sensor may have a drive time that is substantially the same as or longer than the display and/or touch sensor.

Alternative Embodiments

After reading this application, those skilled in the art would recognize that techniques for obtaining information with respect to applied force and contact on a touch I/O device, and using that associated information to determine amounts and locations of applied force and contact on a touch I/O device, is responsive to, and transformative of, real-world data such as attenuated reflection and capacitive sensor data received from applied force or contact by a user's finger, and provides a useful and tangible result in the service of detecting and using applied force and contact with a touch I/O device. Moreover, after reading this application, those skilled in the art would recognize that processing of applied force and contact sensor information by a computing device includes substantial computer control and programming, involves substantial records of applied force and contact sensor information, and involves interaction with applied force and contact sensor hardware and optionally a user interface for use of applied force and contact sensor information.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

We claim:

1. An electronic device, comprising:
a processor;
a frame;
a touch sensor supported by the frame and in communication with the processor; and
a force sensor supported by the frame, disposed below the touch sensor, and in communication with the processor, the force sensor comprising:
a first capacitive sensing element; and
a second capacitive sensing element capacitively coupled to the first capacitive sensing element and separated from the first capacitive sensing element by a sensing gap; wherein:
the processor is configured to obtain a measure of capacitance between the first and second capacitive sensing elements corresponding to a change in the sensing gap resulting from a force applied to a user input surface of the electronic device;
the processor is configured to adjust a calibration of the force sensor, to account for non-input forces applied to the frame, in response to the touch sensor determining that no force is applied to the user input surface; and
the processor is configured to disable the force sensor in response to the touch sensor determining that no force is applied to the user input surface.

2. The electronic device as in claim 1, wherein:
the force sensor is included in a display stack of the electronic device; and
the user input surface comprises a cover glass of the display stack.

3. The electronic device as in claim 2, wherein:
the display stack further includes one or more display circuits disposed below the cover glass; and
the first and second capacitive sensing elements are disposed below the one or more display circuits.

4. The electronic device as in claim 3, wherein the display stack further includes a back light unit disposed between the first and second capacitive sensing elements.

5. The electronic device as in claim 4, further including a compressible material disposed within the sensing gap between the first and second capacitive sensing elements.

6. The electronic device as in claim 4, further including a compressible gap disposed above the one or more display circuits.

7. The electronic device as in claim 4, further including a compressible gap disposed below at least a portion of the one or more display circuits.

8. The electronic device as in claim 3, further including an adhesive layer disposed between the cover glass and the one or more display circuits.

9. The electronic device as in claim 1, further including a support structure disposed between the first and second capacitive sensing elements.

10. The electronic device as in claim 1, wherein the first or the second capacitive sensing element is included in a flexible substrate.

11. The electronic device as in claim 10, wherein the flexible substrate includes a shield.

12. The electronic device as in claim 1, the force sensor further including a piezoelectric film.

13. An electronic device, comprising:
a touch input sensor;
an inertial sensor;
a force sensor supported by a frame and comprising a capacitive sensing element;
a ground layer capacitively coupled to the capacitive sensing element and separated therefrom by a sensing gap; and
a processing unit operatively coupled to the capacitive sensing element and to the inertial sensor; wherein:
the processing unit is configured to obtain a measure of capacitance between the capacitive sensing element and the ground layer that corresponds to a change in the sensing gap resulting from a force applied to a user input surface of the electronic device;
the processing unit is configured to correlate the measure of capacitance to the force;
the processing unit is configured to adjust the measure of capacitance using an orientation of the electronic device determined by the inertial sensor; and
the processing unit is configured to disable the force sensor in response to the touch input sensor determining that no touch is applied to the touch input sensor.

14. The electronic device as in claim 13, wherein:
the force sensor is included in a display stack of the electronic device; and
the user input surface comprises a cover glass of the display stack.

15. The electronic device as in claim 14, wherein:
the display stack further includes one or more display circuits disposed below the cover glass; and
the capacitive sensing element and the ground layer are disposed below the one or more display circuits.

16. The electronic device as in claim 15, wherein the display stack further includes a back light unit disposed between the capacitive sensing element and the ground layer.

17. The electronic device as in claim 16, further including a compressible gap disposed between the capacitive sensing element and the ground layer.

18. The electronic device as in claim 16, further including a compressible gap disposed above the one or more display circuits.

19. The electronic device as in claim 16, further including a compressible gap disposed below at least a portion of the one or more display circuits.

20. The electronic device as in claim 15, further including an adhesive layer disposed between the cover glass and the one or more display circuits.

21. The electronic device as in claim 13, further including a support structure disposed between the capacitive sensing element and the ground layer.

22. The electronic device as in claim 13, wherein the capacitive sensing element is included in a flexible substrate.

23. The electronic device as in claim 22, wherein the flexible substrate includes a shield.

24. The electronic device as in claim 13, the force sensor further including a piezoelectric film.

25. A method for determining an amount of force applied to a user input surface in an electronic device, comprising:
measuring a first capacitance between a first capacitive sensing element and a second capacitive sensing element, the first capacitive sensing element and the second capacitive sensing element each positioned below a touch sensor that has determined that no force is applied to the user input surface;
measuring a second capacitance between the first capacitive sensing element and the second capacitive sensing element based on the applied force to the user input surface;
adjusting the second measured capacitance based on an output of an inertial sensor and on the first capacitance, the output of the inertial sensor corresponding to an orientation of the electronic device; and
correlating the adjusted second measured capacitance to the amount of force applied to the user input surface.

* * * * *